United States Patent
Maggioni et al.

(10) Patent No.: US 7,562,057 B2
(45) Date of Patent: Jul. 14, 2009

(54) SYSTEM AND METHOD FOR HYPER-SPECTRAL ANALYSIS

(75) Inventors: Mauro M. Maggioni, New Haven, CT (US); Ronald R. Coifman, North Haven, CT (US); Andreas C. Coppi, Groton, CT (US); Gustave L. Davis, Orange, CT (US); Richard A. Deverse, Kailua-Kona, HI (US); William G. Fateley, Manhattan, KS (US); Frank Geshwind, Hamden, CT (US); Frederick J. Warner, New Haven, CT (US)

(73) Assignee: Plain Sight Systems, Inc., Hamden, CT (US)

( * ) Notice: Subject to any disclaimer, the term of this patent is extended or adjusted under 35 U.S.C. 154(b) by 845 days.

(21) Appl. No.: 11/230,848

(22) Filed: Sep. 19, 2005

(65) Prior Publication Data
US 2006/0074835 A1    Apr. 6, 2006

Related U.S. Application Data

(60) Continuation-in-part of application No. 11/075,257, filed on Mar. 7, 2005, now Pat. No. 7,219,086, and a continuation-in-part of application No. 10/832,684, filed on Apr. 26, 2004, now abandoned, which is a division of application No. 09/798,860, filed on Mar. 1, 2001, now Pat. No. 6,859,275, which is a continuation-in-part of application No. 09/672,257, filed on Sep. 28, 2000, now Pat. No. 6,392,748, which is a continuation of application No. 09/502,758, filed on Feb. 11, 2000, now Pat. No. 6,128,078, which is a continuation of application No. 09/289,482, filed on Apr. 9, 1999, now Pat. No. 6,046,808.

(60) Provisional application No. 60/610,931, filed on Sep. 17, 2004, provisional application No. 60/550,615, filed on Mar. 6, 2004.

(51) Int. Cl.
*G06N 5/00* (2006.01)

(52) U.S. Cl. .................. 706/20; 706/45; 382/260; 378/65; 600/546

(58) Field of Classification Search .............. 706/20; 382/260; 378/65; 600/546
See application file for complete search history.

(56) References Cited

U.S. PATENT DOCUMENTS 5,596,992 A    1/1997   Haaland et al.
2002/0146160 A1   10/2002  Parker et al.

OTHER PUBLICATIONS

Saito et al., "Local Discriminant Bases and Their Applications," Journal of Mathematical Imaging and Vision, 5:337-38 (1995).

*Primary Examiner*—Wilbert L Starks, Jr.
(74) *Attorney, Agent, or Firm*—Fulbright & Jaworski LLP.

(57) ABSTRACT

An improved method and system for classifying tissue samples comprises determining a tissue type classification based on spectral data of training samples of known target classification. Denoised spectral data is generated from the spectral data based on the tissue type classification. A classifier is then trained using the denoised spectral data to classify the tissue samples.

21 Claims, 14 Drawing Sheets

The Focal Plane of the NIR - DMA Imaging Spectrograph

Filter 1

Filter 1

Filter 3

Filter 3

Filter 1,2,3

Filter 1,2,3

SYSTEM AND METHOD FOR HYPER-SPECTRAL ANALYSIS

RELATED APPLICATION

This application claims priority benefit of provisional patent application No. 60/610,931 filed Sep. 17, 2004, which is incorporated by reference in its entirety. Also, this application is a continuation-in-part of application Ser. No. 11/075,257, filed Mar. 7, 2005 now U.S. Pat. No. 7,219,086, which claims priority benefit of provisional patent application No. 60/550,615 filed Mar. 6, 2004 and which is a continuation-in-part of application Ser. No. 10/832,684, filed Apr. 26, 2004 now abandoned, which is a divisional of application Ser. No. 09/798,860, filed Mar. 1, 2001, now U.S. Pat. No. 6,859,275, which is a continuation-in-part of application Ser. No. 09/672,257, filed Sep. 28, 2000, now U.S. Pat. No. 6,392,748, which is a continuation of application Ser. No. 09/502,758 filed Feb. 11, 2000, now U.S. Pat. No. 6,128,078, which is a continuation of application Ser. No. 09/289,482 filed Apr. 9, 1999, now U.S. Pat. No. 6,046,808, each of which is incorporated by reference in its entirety.

FIELD OF THE INVENTION

The present invention relates generally to methods for hyper-spectral data processing and more particularly to a method and system for characterizing diverse elements within hyper-spectral images.

BACKGROUND OF THE INVENTION

Imagers employ either a two-dimensional (2D) multi-channel detector array or a single element detector. Imagers using a 2D detector array measure the intensity distribution of all spatial resolution elements simultaneously during the entire period of data acquisition. Imagers using a single detector require that the individual spatial resolution elements be measured consecutively via a raster scan so that each one is observed for a small fraction of the period of data acquisition. Prior art imagers using a plurality of detectors at the image plane can exhibit significant signal-to-noise ratio problems. Prior art imagers using a single element detector can exhibit even greater signal-to-noise ratio problems. Signal-to-noise ratio problems limit the utility of imagers applied to chemical imaging applications where subtle differences between a sample's constituents become important.

Spectrometers are commonly used to analyze the chemical composition of samples by determining the absorption or attenuation of certain wavelengths of electromagnetic radiation by the sample or samples. Because it is typically necessary to analyze the absorption characteristics of more than one wavelength of radiation to identify a compound, and because each wavelength must be separately detected to distinguish the wavelengths, prior art spectrometers utilize a plurality of detectors, have a moving grating, or use a set of filter elements. However, the use of a plurality of detectors or the use of a macro moving grating has signal-to-noise limitations. The signal-to-noise ratio largely dictates the ability of the spectrometer to analyze with accuracy all of the constituents of a sample, especially when some of the constituents of the sample account for an extremely small proportion of the sample. There is, therefore, a need for imagers and spectrometers with improved signal-to-noise ratios.

Prior art variable band pass filter spectrometers, variable band reject filter spectrometers, variable multiple band pass filter spectrometers or variable multiple band reject filter spectrometers typically employ a multitude of filters that require macro moving parts or other physical manipulation in order to switch between individual filter elements or sets of filter elements for each measurement. Each filter element employed can be very expensive, difficult to manufacture and all are permanently set at the time of manufacture in the wavelengths (bands) of radiation that they pass or reject. Physical human handling of the filter elements can damage them and it is time consuming to change filter elements. There is, therefore, a need for variable band pass filter spectrometers, variable band reject filter spectrometers, variable multiple band pass filter spectrometers or variable multiple band reject filter spectrometers without a requirement for discrete (individual) filter elements that have permanently set band pass or band reject properties. There is also a need for variable band pass filter spectrometers, variable band reject filter spectrometers, variable multiple band pass filter spectrometers or variable multiple band reject filter spectrometers to be able to change the filters corresponding to the bands of radiation that are passed or rejected rapidly, without macro moving parts and without human interaction.

In several practical applications it is required that an object be irradiated with radiation having particularly shaped spectrum. In the simplest case when only a few spectrum lines (or bands) are necessary, one can use a combination of corresponding sources, each centered near a required spectrum band. Clearly, however, this approach does not work in a more general case, and therefore it is desirable to have a controllable radiation source capable of providing arbitrary spectrum shapes and intensities. There is a need for a controllable radiation source, where virtually arbitrary spectrum shape and characteristics can be designed, and where disadvantages associated with the prior art are obviated. Further, it is desirable not only to shape the spectrum of the radiation source, but also encode its components differently, which feature can be used to readily perform several signal processing functions useful in a number of practical applications. The phrase "a spectrum shape" in this disclosure refers not to a mathematical abstraction but rather to configurable spectrum shapes having range(s) and resolution necessarily limited by practical considerations.

In addition to signal-to-noise issues, one can consider the tradeoff between signal-to-noise and, for example, one or more of the following resources: system cost, time to measure a scene, and inter-pixel calibration. Thus, in certain prior art systems, a single sensor system can cost less to produce, but will take longer to fully measure an object under study. In prior art multi-sensor systems, one often encounters a problem in which the different sensor elements have different response characteristics, and it is necessary to add components to the system to calibrate for this. It is desirable to have a system with which one gains the lower-cost, better signal-to-noise, and automatic inter-pixel calibration advantages of a single-sensor system while not suffering all of the time loss usually associated with using single sensors.

With light sources of increasingly broader ranges, the spectral analysis of tissue sections has evolved from two wavelength image subtraction techniques to Raman near infra-red micro-spectroscopic mapping permitting discrimination of cell types and tissue patterns.

The collection of spectral vectors in a given image patch will exhibit variability from a variety of sources. Some of these sources are biological in nature, such as the local density of cytoplasm; others are non-biological in nature and can include such things as non-uniformities in the light source used to collect the data, drifts in instrumental parameters during the time of data collection, orientation of cells in the tissue and the like. Hence, it is desirable to eliminate variabilities due to non-biological factors, and to characterize tissue elements by spectral variability which is due only to the intrinsic biology.

OBJECT AND SUMMARY OF THE INVENTION

Therefore, it is an object of the present invention to provide a method and system for hyper-spectral analysis which overcomes the above-noted shortcomings.

An object of the present invention is to provide a method and system for hyper-spectral analysis as aforesaid, which characterizes or distinguishes diverse elements within hyper-spectral images.

An object of the present invention is to provide a method and system for hyper-spectral analysis of normal, abnormal and malignant micro-array tissue sections.

In accordance with an embodiment of the present invention, the hyper-spectral analysis method for characterizing or distinguishing diverse elements within hyper-spectral images, comprises the steps of extracting a plurality of patches of pixels from within the hyper-spectral images as being patches around pixels of the elements to be characterized or distinguished; computing the statistics of selected spectral features for each patch of pixels, a first classifier from feature-wise standard deviation of the selected spectral features in each patch, a set of second classifiers from principal components of the spectral in each patch, and a classifier based on the output of the first classifier and at least one of the second classifiers; and characterizing or distinguishing the elements based on the output of at least one of the classifiers, preferably the combined classifier.

In accordance with an embodiment of the present invention, a computer readable medium comprises code for characterizing diverse elements within hyper-spectral images, the code comprises instructions for extracting a plurality of patches of pixels from within the hyper-spectral images as being patches around pixels of the elements to be characterized or distinguished; computing the statistics of selected spectral features for each patch of pixels, a first classifier from feature-wise standard deviation of the selected spectral features in each patch, a set of second classifiers from principal components of the spectral in each patch, and a classifier based on the output of the first classifier and at least one of the second classifiers; and characterizing or distinguishing the elements based on the output of at least one of the classifiers, preferably the combined classifier.

In accordance with an embodiment of the present invention, a hyper-spectral analysis system for characterizing or distinguishing diverse elements within hyper-spectral images, comprises an extracting module for extracting a plurality of patches of pixels from within the hyper-spectral images as being patches around pixels of the elements to be characterized or distinguished; a computing module for computing the statistics of spectra for each patch of pixels, a first classifier from frequency-wise standard deviation of the spectra in each patch, a set of second classifiers from principal components of the spectra in each patch, and a combined classifier based on the output of the first classifier and at least one of the second classifiers; and a characterization module for characterizing or distinguishing the elements based on the output of at least one of the classifiers.

In accordance with an embodiment of present invention, the hyper-spectral analysis system and method characterizes sub-elements of a tissue image, collects hyper-spectral tissue signatures, and analyzes local variability of such hyper-spectral signatures to characterize the tissue elements. Such spectral signatures generally possess both biological and non-biological variability, and hyper-spectral analysis system and method of the present invention characterizes and removes such non-biological variability.

In accordance with an embodiment of the present invention, the hyper-spectral analysis system and method analyzes the local variability of spectra in image patches, thereby enabling spectral and spatio-spectral characterization of local tissue elements. The hyper-spectral system and method can be applied to the analysis of any biological tissues, including but not limited to prepared microscopic slides, in vivo dermatologic tissues, tissues accessed via endoscopy and the like.

In accordance with an embodiment of the present invention, the hyper-spectral analysis system and method characterizes sub-elements of hyper-spectral datasets, analyzes the local spectral variability of image patches, and the discriminates between variabilities due to different factors, such as biological and non-biological factors.

In accordance with an embodiment of the present invention, the hyper-spectral analysis system and method are widely applicable to hyper-spectral data analysis, including the analysis of biological tissue samples, such as the analysis of normal, abnormal and malignant micro-array tissue sections.

In accordance with an embodiment of the present invention, the hyper-spectral analysis system and method characterizes sub-elements of a tissue image in which each pixel of the image is represented by a spectral vector of responses to various wavelengths or combinations of wavelength. In accordance with an aspect of the present invention, the nature of the tissue in the vicinity of the pixel can be characterized by analyzing the variability of the spectral signatures in small image patches overlapping that vicinity.

In accordance with an embodiment of the present invention, the hyper-spectral analysis system and method removes the non-biological variability from the pixel spectra by considering the local principal components calculated from all of the spectra in a small image patch containing the pixel. For example, such components can measure large-scale effects due to normalization deficiencies in the data collection process. How many of the local top principal component vectors are related to normalization effects can be determined based on the optimization of a cross-validated measure of success for a given biologically-relevant task. Such tasks might include separation of nuclei from other tissue elements, such as cytoplasm, distinguishing normal from abnormal tissues, or quantifying the density of a material (e.g. keratin). Deleterious normalization effects can be removed by projecting the data onto only the most biologically-relevant principal vectors. It is appreciated that these vectors are distinct from the principal component vectors of the full tissue scene. These vectors carry only local information on the nature of the variability for a given patch.

In accordance with an embodiment of the present invention, the hyper-spectral analysis system and method characterizes the tissue elements according to the adaptive descriptions of their intrinsic biological variability. The variability of spectra in a given image patch can be summarized by a variety of methods, such as a vector of variances for each spectral response over the entire patch. For example, each patch is associated with a particular vector and features of these vectors can be extracted which represent successful performance of some biologically-relevant task as described herein. That is, the local variability space can be transformed into a new coordinate system which has a much smaller dimensionality and optimized for solving some relevant biological problem.

The present invention can determine such coordinates from the variability vectors in either a linear or a non-linear manner. For example, various methods can be utilized for such determination, such as the Local Discriminant Basis method and Laplacian eigenfunction methods using the graph structure of the variability space.

In accordance with an embodiment of the present invention, the hyper-spectral analysis system and method utilizes the spectral data collected from a pathology slide using a tuned light source spectral imaging system. The local variability analysis in accordance with an embodiment of the present invention characterizes nuclei and other tissue types, and distinguishes normal from abnormal tissue in a mixed (cancer and non-cancer) patient population. It is appreciated that the present invention can be applied in a similar manner to different spectral image data sets and to any locally quantifiable biological task. Although the present invention has been described in the context of analyzing biological tissues, the hyper-spectral analysis system and method of the present invention is not limited to biological tissues. The present invention is applicable to any hyper-spectral image in which diverse elements exist. For example, the present invention can be easily applied to a hyper-spectral satellite image to distinguish man-made objects from natural terrain.

In accordance with an embodiment of the present invention, an improved method for training a classifier to classify tissue samples, comprising the steps of: determining a tissue type classification based on spectral data of training samples of known target classification; generating denoised spectral data from the spectral data based on the tissue type classification; and training a classifier on the denoised spectral data to provide a classification of the tissue samples.

In accordance with an embodiment of the present invention, a computer readable medium comprises code for classifying tissue samples. The code comprises instructions for: determining a tissue type classification based on spectral data of training samples of known target classification; generating denoised spectral data from the spectral data based on the tissue type classification; training a classifier on the denoised spectral data; and classifying the tissue samples using the trained classifier.

In accordance with an embodiment of the present invention, a system for classifying tissue samples comprises: a preliminary classifier for determining a tissue type classification based on spectral data of training samples of known target classification; a processing module for generating denoised spectral data from the spectral data based on the tissue type classification; and a training module for training a classifier on the denoised spectral data. The trained classifier can then be used to classify the tissue samples.

In accordance with an embodiment of the present invention, a method of classifying tissue samples comprising the steps of: determining a tissue type classification based on spectral data of training samples of known target classification; generating denoised spectral data from the spectral data based on the tissue type classification; training a classifier on the denoised spectral data; and classifying the tissue samples using the trained classifier.

It is intended that the devices and methods in this application in general are capable of operating in various ranges of electromagnetic radiation, including the ultraviolet, visible, infrared, and microwave spectrum portions. Further, it will be appreciated by those of skill in the art of signal processing, be it acoustic, electric, magnetic, etc., that the devices and techniques disclosed herein for optical signal processing can be applied in a straightforward way to those other signals as well.

BRIEF DESCRIPTION OF THE DRAWINGS

The present invention will be understood and appreciated more fully from the following detailed description, taken in conjunction with the drawings in which.

DETAILED DESCRIPTION OF THE EMBODIMENTS

Figure 1A:
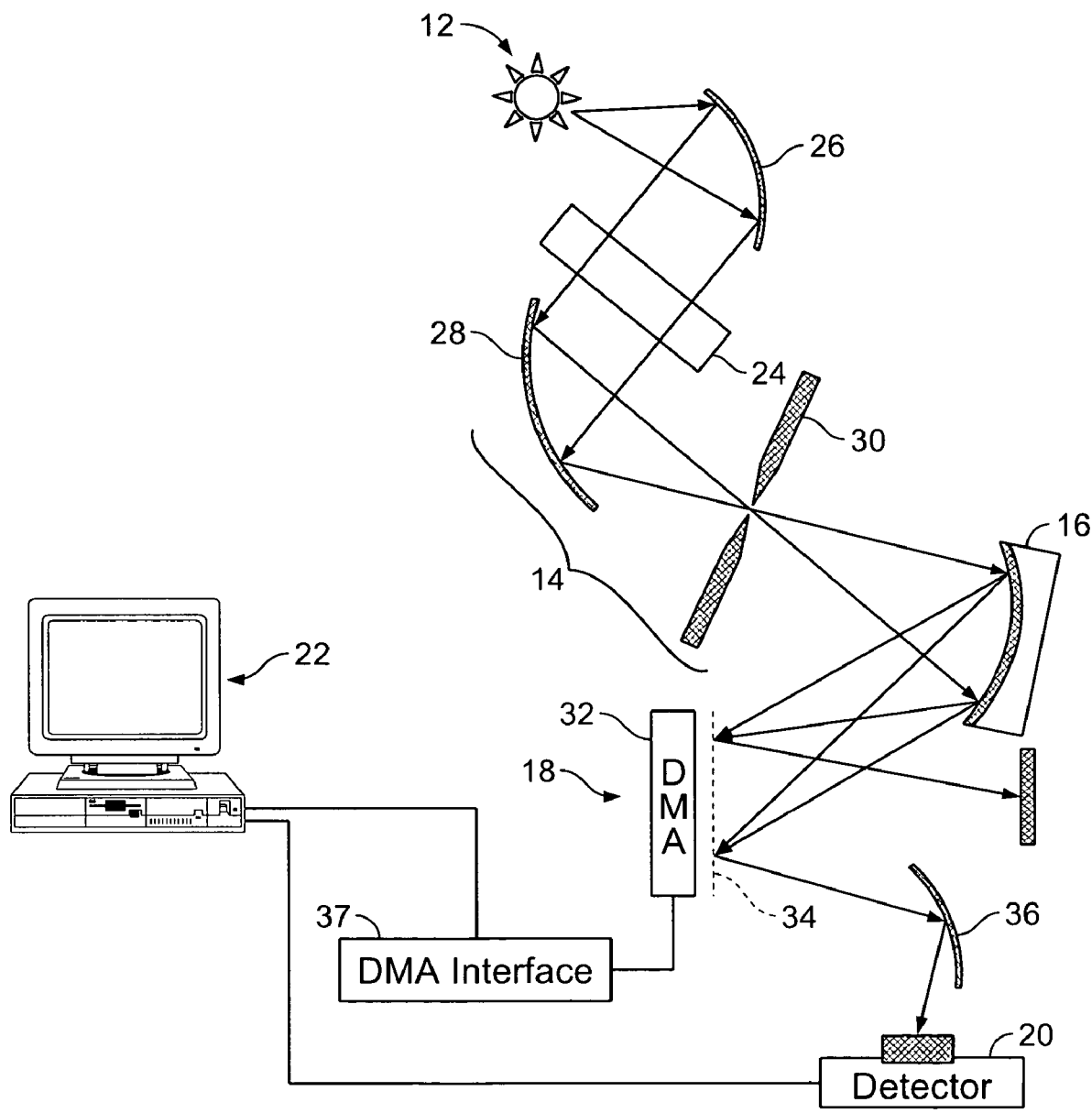
FIGS. 1A and 1B are schematic diagrams illustrating a spectrometer constructed in accordance with two embodiments of the invention.
Figure 1B:
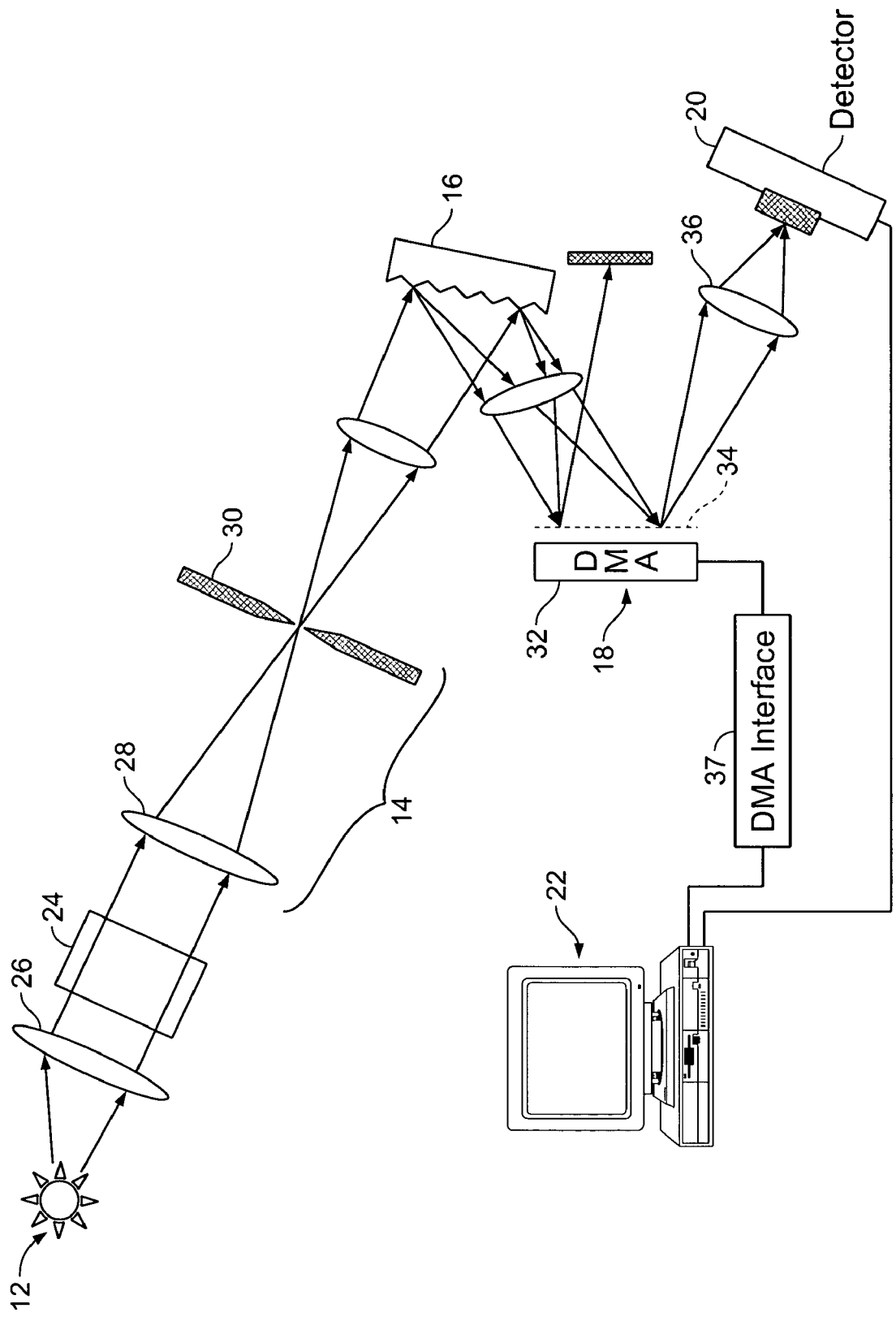

Turning now to the FIGS. 1A and 1B, a spectrometer assembly 10 in accordance with an embodiment of the invention is illustrated. With reference to FIG. 1A the device broadly comprises a source 12 of electromagnetic radiation, a mirror and slit assembly 14, a wavelength dispersing device 16, a spatial light modulator 18, a detector 20, and an analyzing device 22.

In particular, the electromagnetic radiation source 12 is operable to project rays of radiation onto or through a sample 24 that is to be analyzed, such as a sample of body tissue or blood. The radiation source can be any device that generates electromagnetic radiation in a known wavelength spectrum such as a globar, hot wire, or light bulb that produces radiation in the infrared spectrum. To increase the amount of rays that are directed to the sample, a parabolic reflector 26 can be interposed between the source 12 and the sample 24. In a specific embodiment, the source of electromagnetic radiation is selected as to yield a continuous band of spectral energies, and is referred to as the source radiation. It should be apparent that the energies of the radiation source are selected to cover the spectral region of interest for the particular application.

The mirror and slit assembly 14 is positioned to receive the radiation rays from the source 12 after they have passed through the sample 24 and is operable to focus the radiation onto and through an entrance slit 30. The collection mirror 28 focuses the radiation rays through slit 30 and illuminates the wavelength dispersing device 16. As shown in FIG. 1B, radiation rays from the slit can also be collected through a lens 15 before illuminating a wavelength dispersion device 16 in accordance with an embodiment of the present invention.

The wavelength dispersing device 16 receives the beams of radiation from the mirror and slit assembly 14 and disperses the radiation into a series of lines of radiation each corresponding to a particular wavelength of the radiation spectrum. The preferred wavelength dispersing device 16 is a concave diffraction grating; however, other wavelength dispersing devices, such as a prism, can be utilized. In a specific embodiment, the wavelengths from the dispersing device 16 are in the near infrared portion of the spectrum and can cover, for example, the range of 1650-1850 nanometers (nm). It should be emphasized, however, that in general this device is not limited to just this or to any spectral region. It is intended that the dispersion device in general is capable of operating in other ranges of electromagnetic radiation, including the ultraviolet, visible, infrared, and microwave spectrum portions, as well as acoustic, electric, magnetic, and other signals, where applicable.

Figure 2:
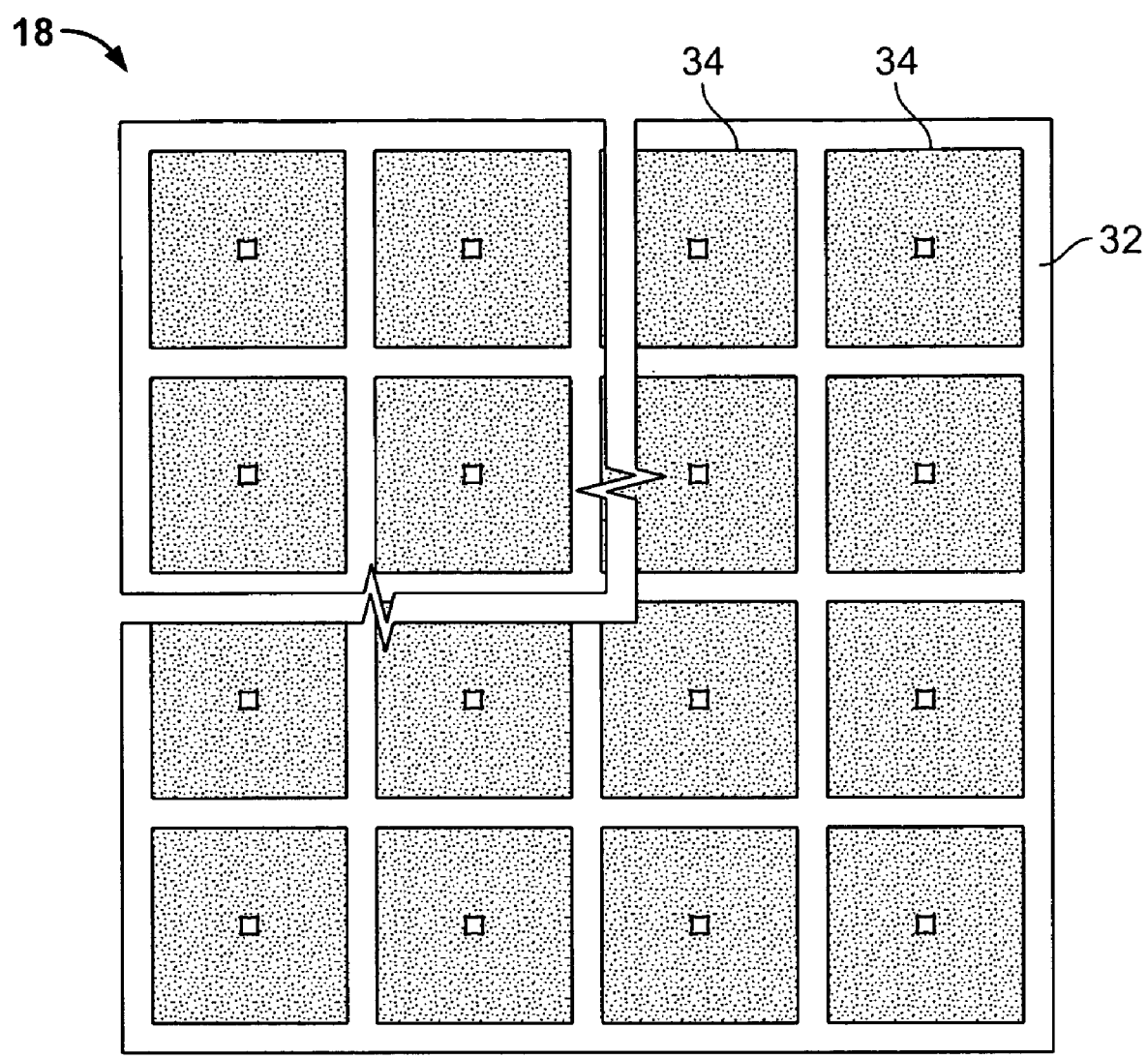
FIG. 2 is a plan view of a micro-mirror array used in the present invention.

The spatial light modulator (SLM) 18 receives radiation from the wavelength dispersing device 16, individually modulates each spectral line, and reflects the modulated lines of radiation onto the detector 20. As illustrated in FIG. 2, the SLM 18 in accordance with an embodiment of the present invention can be implemented as a micro-mirror array that includes a semi-conductor chip or piezo-electric device 32 having an array of small reflecting surfaces 34 thereon that act as mirrors. One such micro-mirror array is manufactured by Texas Instruments and is described in more detail in U.S. Pat. No. 5,061,049, which is incorporated by reference in its entirety. Those skilled in the art will appreciate that other spatial light modulators, such as a magneto-optic modulator or a liquid crystal device can be used instead of the micro-mirror array. Various embodiments of such devices are discussed in more detail below.

Figure 3:
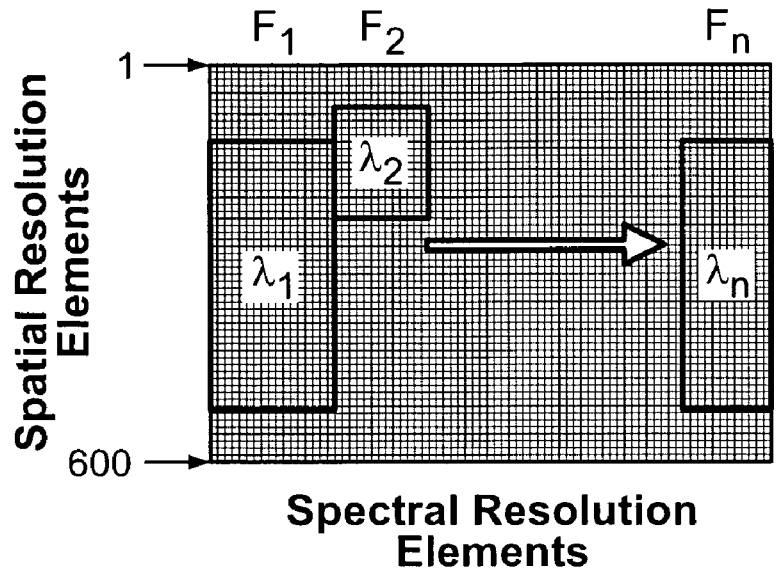
FIG. 3 illustrates spatio-spectral distribution of a DMA, where individual elements can be modulated.
Figure 6A:
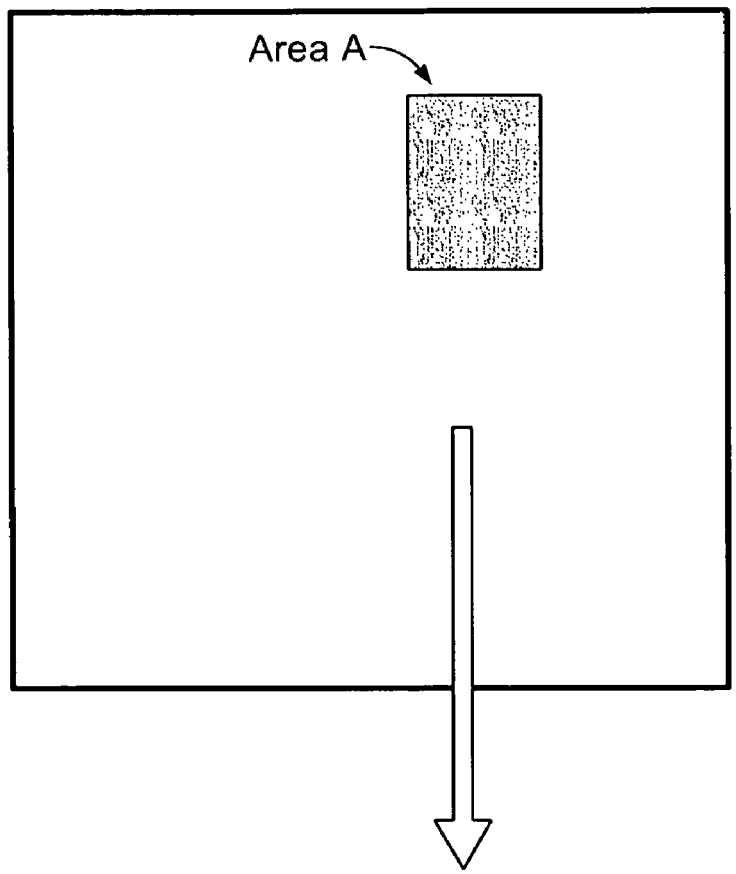
FIG. 6 illustrates the design of multi-modal band-pass or band-reject filters with corresponding intensity plots, in accordance with the present invention.
Figure 6A:
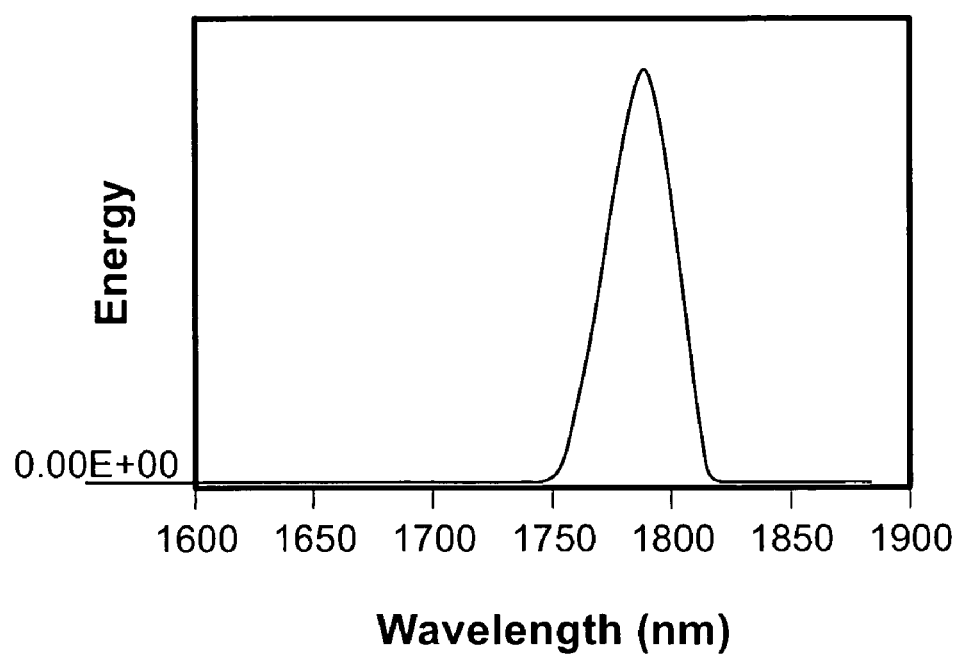
Figure 6B:
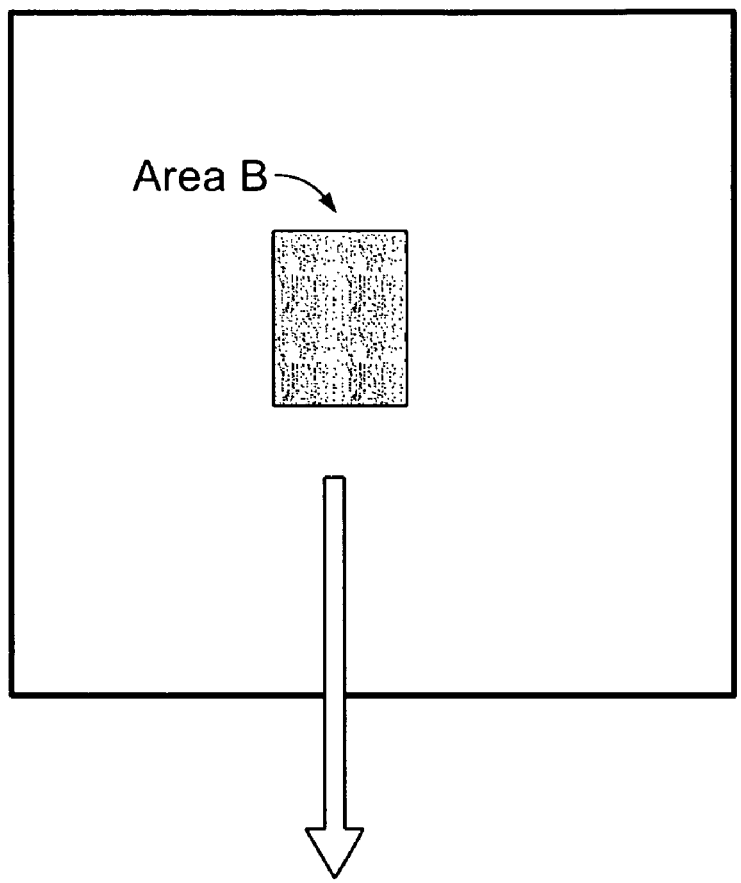
Figure 6B:
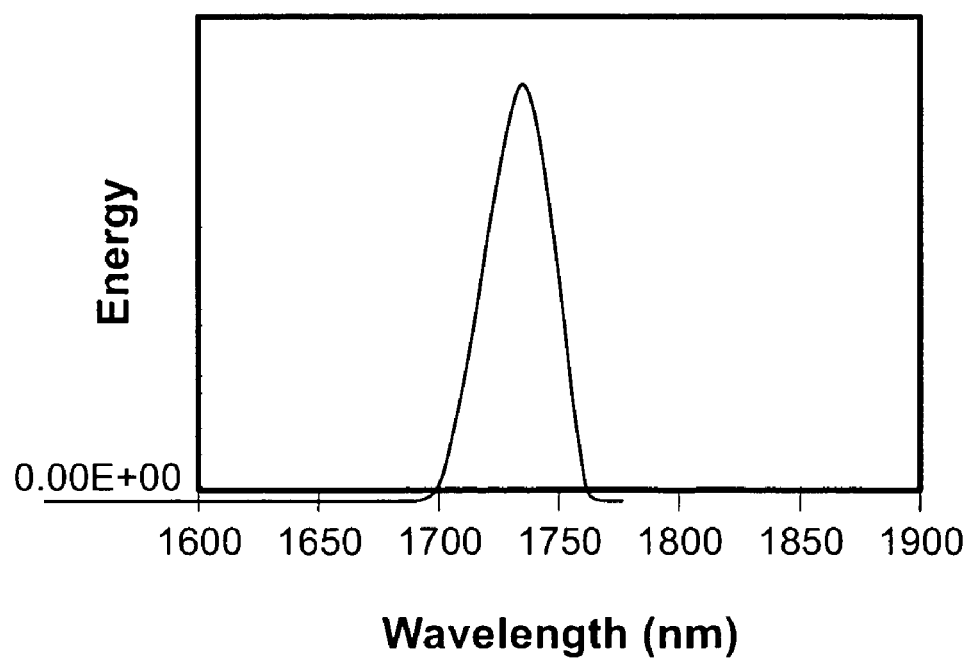
Figure 6C:
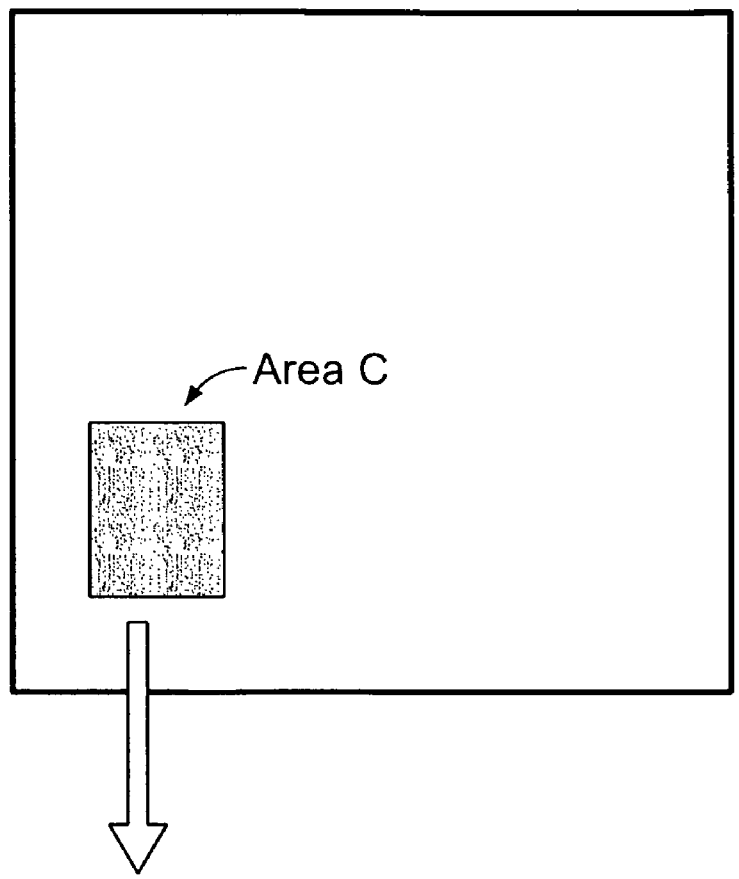
Figure 6C:
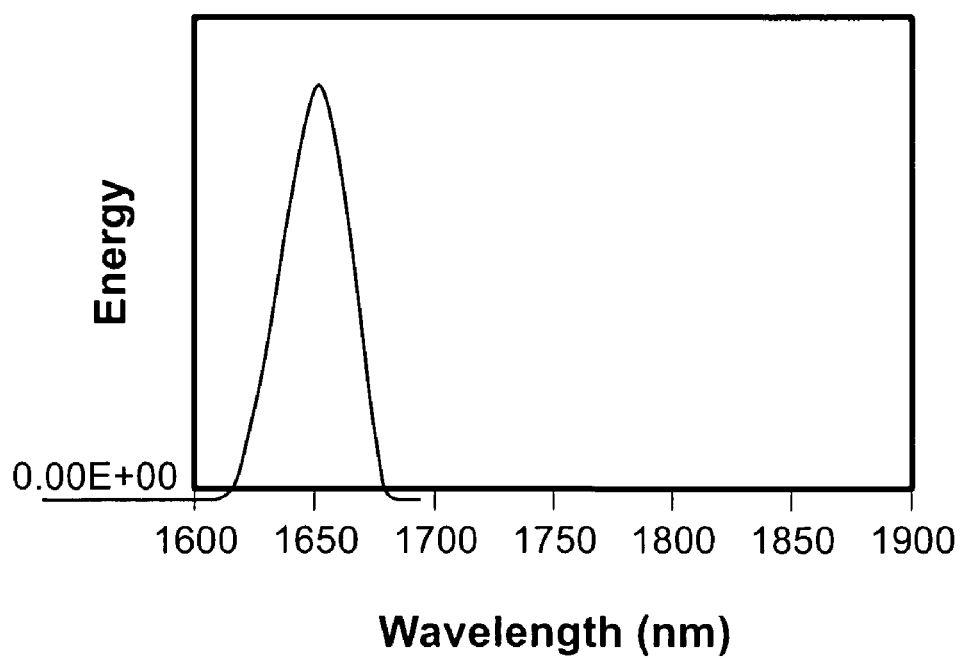
Figure 6D:
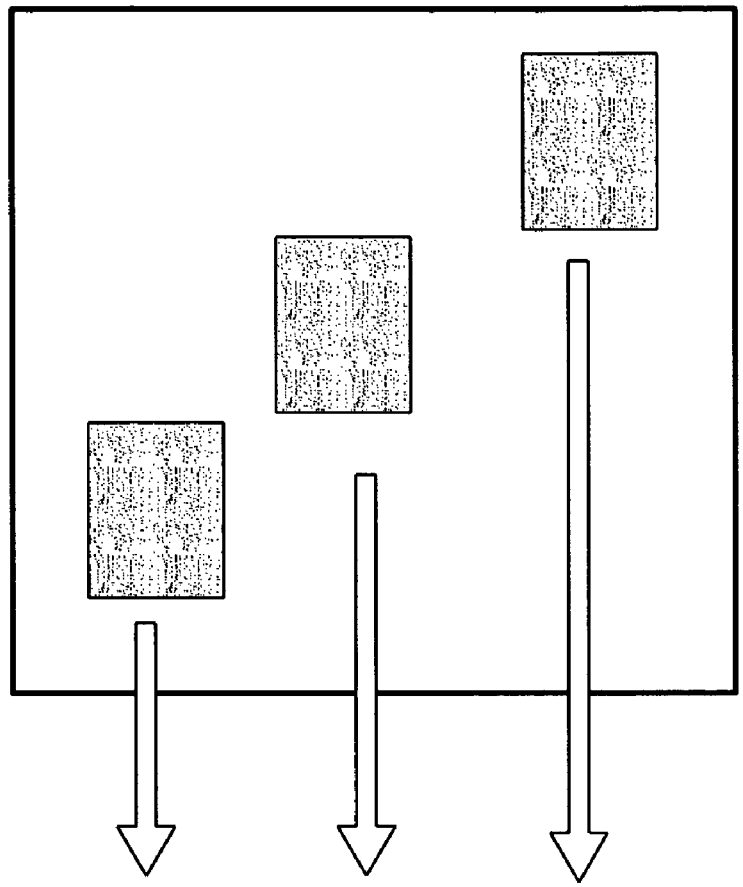
Figure 6D:
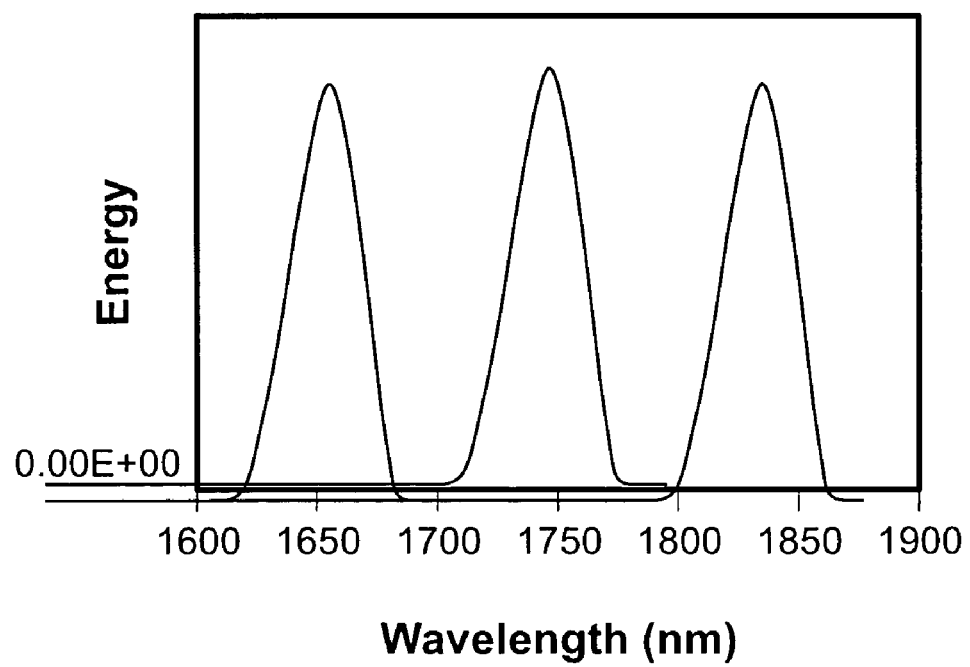

In accordance with an embodiment of the present invention, the system as illustrated in FIG. 3 can be used for digital imaging purposes. In particular, when used as an imaging device, an image of a sample 38 is focused onto a micro-mirror array 40 and each micro-mirror in the array 40 is modulated at a different modulation rate. The micro-mirror array geometry is such that some or all of the reflected radiation impinges upon a single detector element 42 and is subsequently demodulated to reconstruct the original image improving the signal-to-noise ratio of the imager. Specifically, an analyzing device 44 digitally processes the combined signal to analyze the magnitude of each individual pixel. FIG. 6B illustrates spatio-spectral distribution of the DMA in accordance with an embodiment of the present invention, where individual elements can be modulated.

Figure 4:
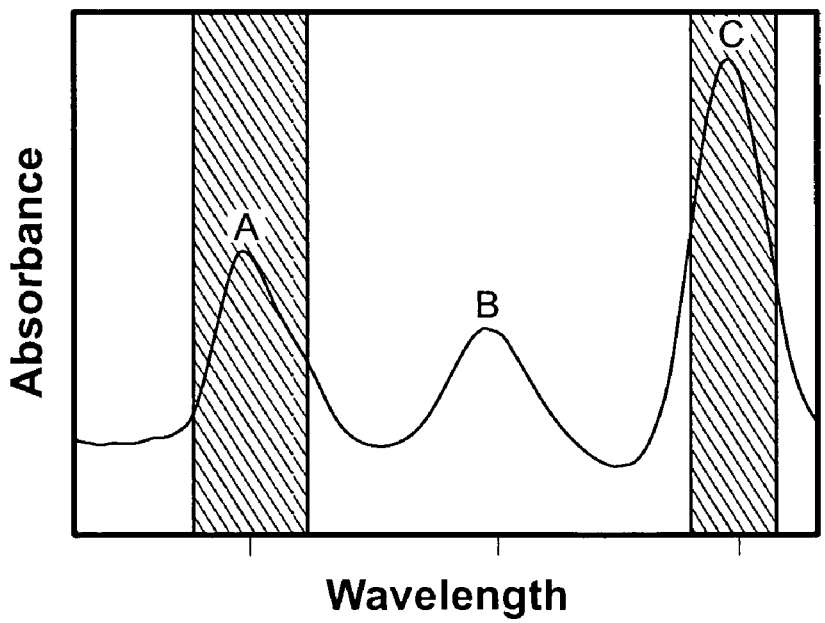
FIG. 4 is an illustration of the input to the DMA Filter Spectrometer and its use to pass or reject wavelength of radiation specific to constituents in a sample.

FIG. 4 illustrates the output of a digital micro-mirror array (DMA) filter spectrometer of the present invention used as a variable band pass filter spectrometer, variable band reject filter spectrometer, variable multiple band pass filter spectrometer or variable multiple band reject filter spectrometer. In this embodiment, the combined measurement of the electromagnetic energy absorbed by sample constituents A and C is of interest. The shaded regions in FIG. 4 illustrate the different regions of the electromagnetic spectrum that will be allowed to pass to the detector by the DMA filter spectrometer. The wavelengths of electromagnetic radiation selected to pass to the detector correspond to the absorption band for compound A and absorption band for compound C in a sample comprising of compounds A, B, and C. The spectral region corresponding to the absorption band of compound B and all other wavelengths of electromagnetic radiation are rejected. Those skilled in the art will readily appreciate that the DMA filter spectrometer is not limited to the above example and can be used to pass or reject any combination of spectral resolution elements available to the DMA. Various examples and modifications are considered in detail herein.

As a DMA filter imager, the spatial resolution elements (pixels) of an image can be selectively passed or rejected (filtered) according to the requirements of the image measurement. The advantages of both the DMA filter spectrometer and DMA filter imager are:

All spectral resolution elements or spatial resolution elements corresponding to the compounds of interest in a particular sample can be directed simultaneously to the detector for measurement. This has the effect of increasing the signal-to-noise ratio of the measurement.

The amount of data requiring processing is reduced. This reduces storage requirements and processing times.

Figure 5:
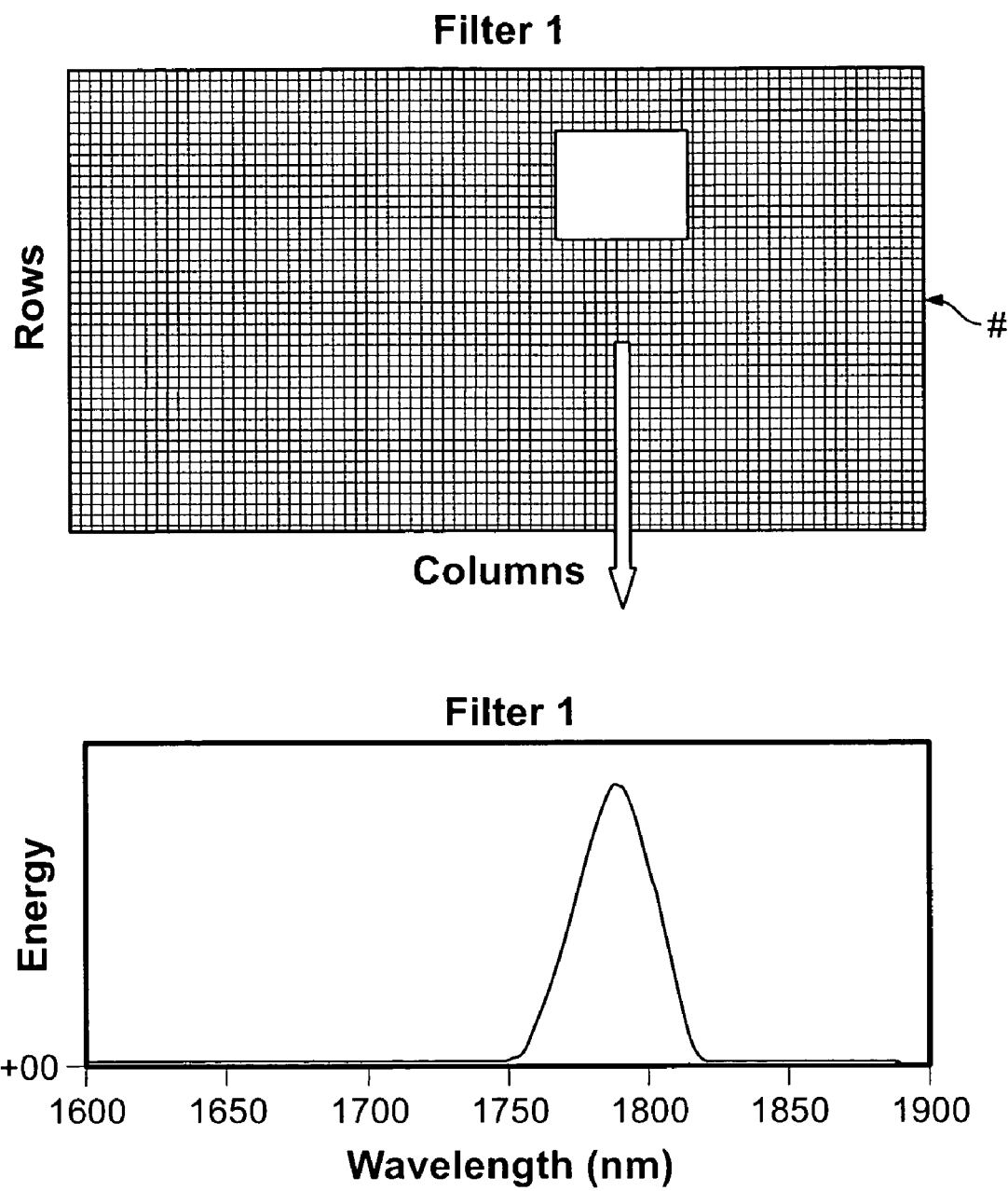
FIG. 5 illustrates the design of a band pass filter in accordance with the present invention (top portion) and the profile of the radiation passing through the filter (bottom portion)

As noted herein, using a DMA one can provide one or more spectral band pass or band-reject filter(s) with a chosen relative intensity. In particular, in accordance with an embodiment of the present invention, the radiation wavelengths that are reflected in the direction of the detector are selected by specific columns of micro-mirrors of the DMA, as illustrated in FIG. 5. The relative intensity of the above spectral band is controlled by the selection of specific area of micro-mirrors on the DMA, represented by the dark area designated "A" in FIG. 5. Thus, the dark area shown in FIG. 5 is the mirrors that direct specific wavelength radiation, i.e., spectral band, to the detector. Clearly, the "on" mirrors in the dark area create a band-pass filter, the characteristics of which are determined by the position of the "on" area in the DMA. The bottom portion of the FIG. 5 illustrates the profile of the radiation reaching the detector.

FIG. 5 also demonstrates the selection of specific rows and columns of mirrors in the DMA used to create one spectral band filter with a single spectral mode. It should be apparent, however, that using the same technique of blocking areas in the DMA one can obtain a plurality of different specific spectral band filters, which can have multi-modal characteristics. An exemplary design of such filters is illustrated in FIG. 6.

As shown in FIG. 6, a multitude of different specific filters can be designed on one DMA using simple stacking. FIG. 6 illustrates the generation of several filters by selective reflection from specific micro-mirrors. In particular, the left side of FIG. 6 illustrates the generation of three different filters, designated 1, 2, and 3. This is accomplished by the selection of specific mirrors on the DMA, as described herein with reference to FIG. 5. The total collection of spectral band filters is shown at the bottom-left of FIG. 6. The spectral band provided by each filter is shown on the right-hand side of FIG. 6. The bottom right portion illustrates the radiation passing through the combination of filters 1, 2 and 3.

The discussions hereinabove describe how the relative intensity of each spectral band can be a function of the DMA area used in the reflection. The following table delineates the linear relationship between areas of the DMA occupied by individual filters, and the resulting filter. Clearly, if the entire DMA array is in the "on" position, there will be no filtering and in principle the input radiation passes through with no attenuation.

| FIG. 6, left side<br>Reflected radiation from micro-mirrors | FIG. 6, right side<br>Filter created |
|---|---|
| area A | 1 |
| area B | 2 |
| area C | 3 |
| areas a + b + c | 1 + 2 + 3 |

Figure 7:
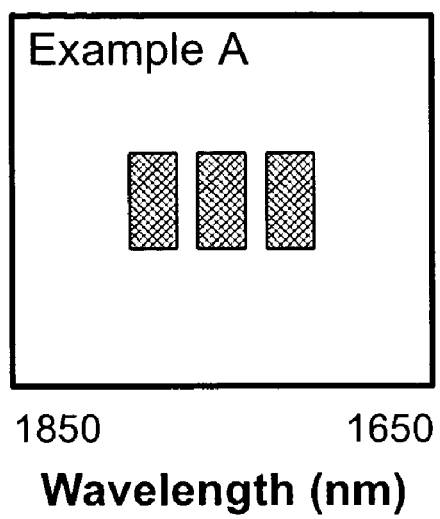
FIG. 7 illustrates the means for the intensity variation of a spectral filter built in accordance with this invention.
Figure 7:
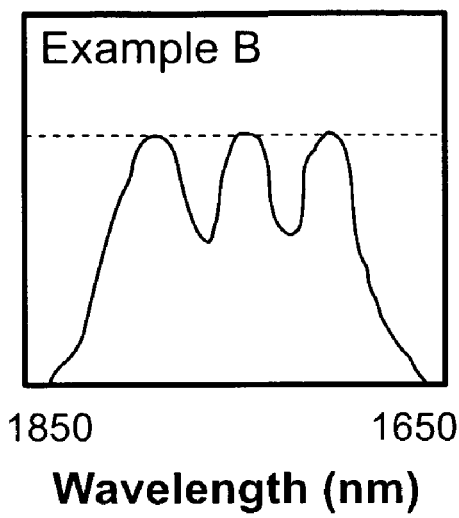
Figure 7:
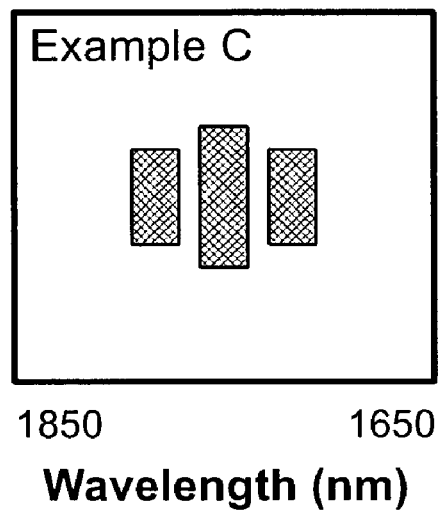
Figure 7:
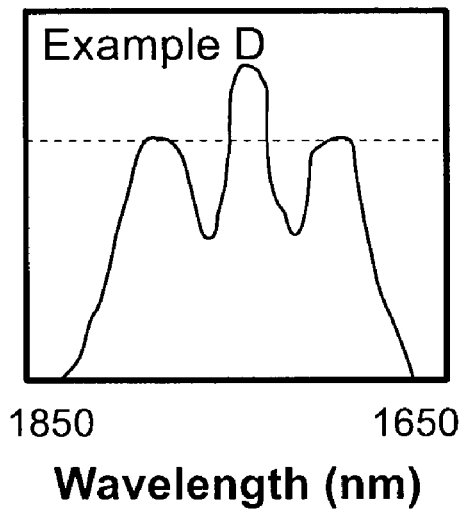
Figure 7:
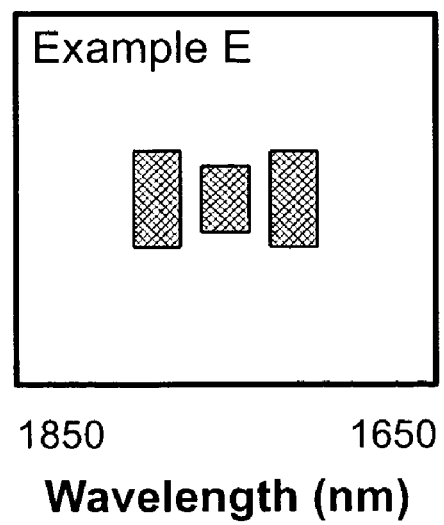
Figure 7:
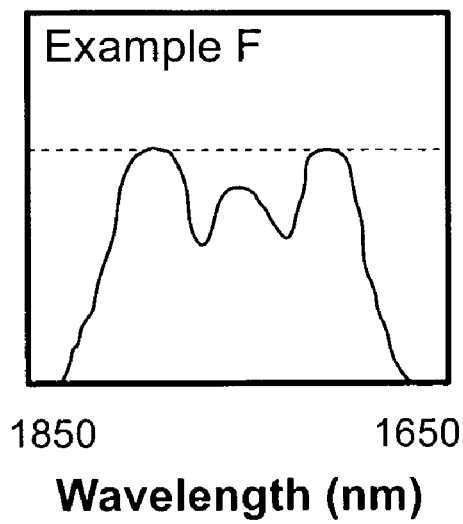

FIG. 7 illustrates the means for the intensity variation of a spectral filter in accordance with an embodiment of the present invention, and is summarized in the table below.

| Example A | Example B |
|---|---|
| Reflection from a DMA See FIGS. 5 and 6. Reflection areas 1, 2, and 3 create spectral filter 1, 2 and 3 respectively. | The intensity recorded at the detector for example A for the combination filter 1, 2, and 3, Intensity, I, $I_1 = I_2 = I_3$ Example D |
| area 1 = area 2 = area 3 Example C | The intensity recorded at the detector for filters 1, 2, and 3 is |
| The reflection of area 2 of the DMA is increased. area 1 = area 3 < area 2 | $I_1 \approx I < I_2$ Example F |
| Example E | The intensity recorded at the |
| The reflection of area 2 of the DMA is decreased area 1 = area 3 > area 2 | detector for filter 1, 2, and 3 is $I_1 \approx I_3 > I_2$ |

FIGS. 6 and 7 illustrate the ability to design spectral filters with different characteristics using a DMA. A point to keep in mind is that different spectral components of the radiation from the sample have been separated in space and can be filtered individually. The ability to process individual spectral components separately should be retained. To this end, in accordance with an embodiment of the present invention, spectral components are modulated.

The present invention modulates the output from different filters differently, so one can identify and process them separately. In a preferred embodiment, different modulation is implemented by means of different modulation rates. Thus, with reference to FIG. 6, the output of filter 1 is modulated at rate $M_1$; output of filter 2 is modulated at rate $M_2$, and filter 3 is modulated using rate $M_3$, where $M_1 \neq M_2 \neq M_3$. In different embodiments, modulation can be achieved by assigning a different modulation encodement to each filter, with which it is modulated over time.

As a result, a system in accordance with an embodiment of the present invention is capable of providing: a) spectral bandwidth by selection of specific columns of micro-mirrors in an array; b) spectral intensity by selection of rows of the array; and c) spectral band identification by modulation.

Figure 8A:
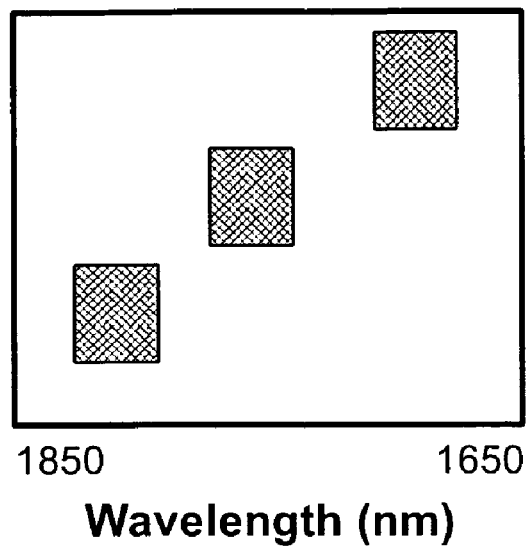
FIGS. 8A and 8B show embodiments in which the DMA is replaced with concave mirrors
Figure 8B:
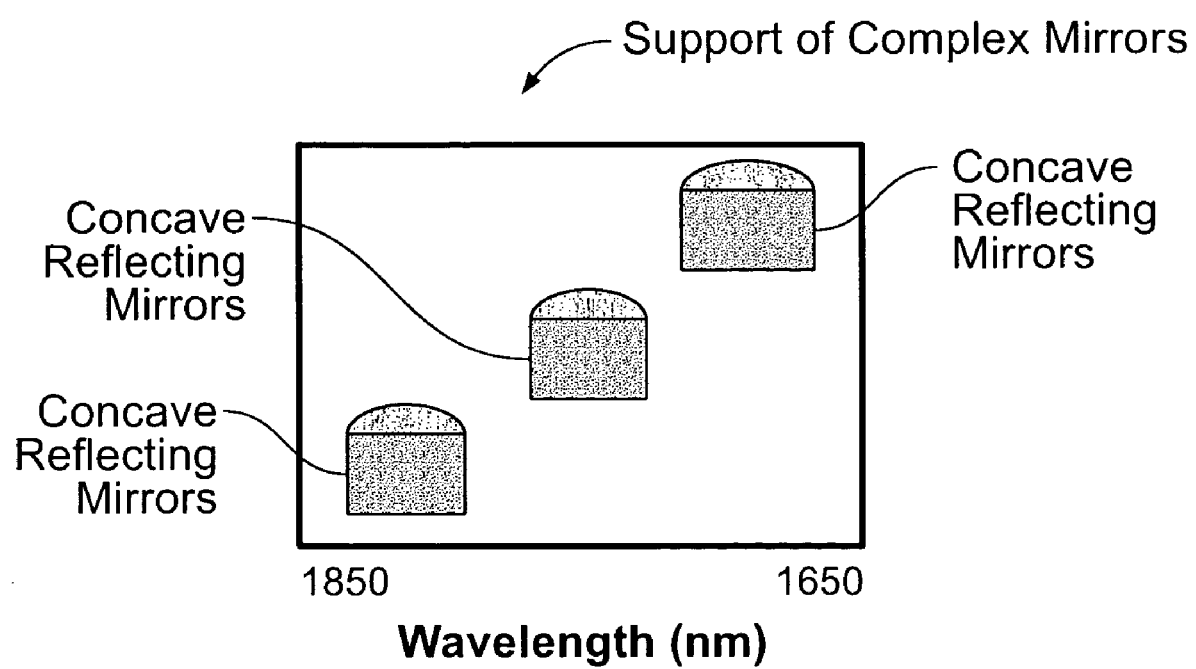

FIGS. 8A-8B illustrate an alternative embodiment of a modulating spectrometer in accordance with this invention, where the DMA is replaced with different components. In particular, FIGS. 8A and B show an embodiment in which the DMA is replaced with fixed elements, such as concave mirrors. In accordance with an embodiment of the present invention, the system utilizes fixed spectral grating, which masks out spectrum block components that are not needed and passes those which are.

The broadly illuminated dispersive element distributes spectral resolution elements in one dimension so that in the orthogonal dimension one can collect light of the same wavelengths. With reference to FIG. 3 one can see that at a particular plane, herein called the focal plane, one has a wavelength axis (x or columns) and a spatial axis (y or rows). If one were to increase the number of spatial resolution elements (y) that are allowed to pass energy through the system and out of the exit aperture for any given wavelength (x), or spectral resolution element (x), this would have the effect of increasing the intensity of the particular spectral resolution elements' intensity at the detector.

If the array of spatio/spectral resolution elements at the focal plane as shown in FIG. 3 is replaced with fixed elements, such as the concave mirrors in FIG. 8B, a different device can be configured to perform a particular signal processing task—such as to pass the predetermined spectrum components at the desired intensity levels. FIG. 8A shows the spatio/spectral resolution elements at the focal plane to be used. The fixed optical elements are placed to interact with predetermined spatio/spectral resolution elements provided by the grating and entrance aperture geometry and to direct the specific assortment of spatio/spectral elements to specific spatial locations for modulation encoding (possibly using the barber pole arrangement, described herein).

Figure 9:
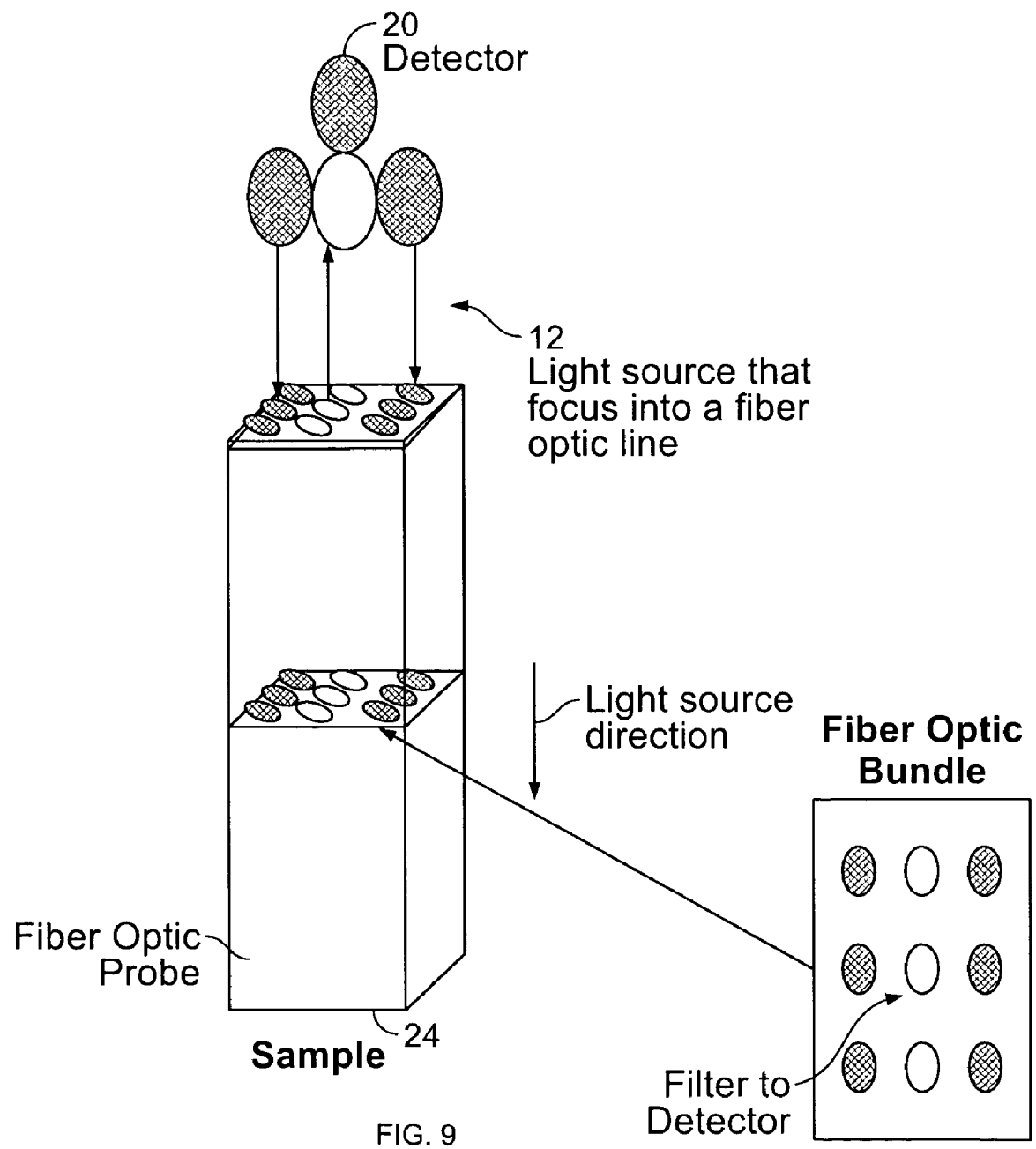
FIG. 9 illustrates an embodiment of this invention in which one or more light sources provide several modulated spectral bands using a fiber optic bundle.

FIG. 9 illustrates the combination of several light sources in the spectrometer. The choice of several different spectral bands of electromagnetic radiation can be light emitting diodes, LED, lasers, black body radiation, microwaves and/or the like. Essentially the following modulation scheme can be used to identify the different light sources, in this example LED's of different spectral band wavelength.

| No. of Source | Spectral band Wavelength, rim | Modulation Rate |
|---|---|---|
| 1 | 1500-1700 | $m_1$ |
| 2 | 1600-1800 | $m_2$ |
| 3 | 1700-1900 | $m_3$ |
| . | . | . |
| . | . | . |
| . | . | . |

Note:
$m_1 \neq m_2 \neq m_3 \neq \ldots$

It should be noted that either the radiation will be scattered or transmitted by the sample 24. This scattered or transmitted radiation from the sample is collected by an optical fiber. This radiation from the sample is conducted to the detector. The signal from the detector is electronically processed to yield quantitative and qualitative information about the sample.

In accordance with an embodiment of the present invention, the radiation path comprises optical fibers. Alternatively, mirrors and lenses can also constitute the optical path for a similar modulating multi-light source spectrometer.

The spectrometer of the present invention records spectral information about one unique area on a single detector. In a similar manner, the spectral characteristic of a multitude of areas in a sample can be recorded with a multitude of detectors in accordance with different embodiments of the invention. Such a multitude of detectors exists in an array detector. Array detectors are known in the art and include, for example charge coupled devices (CCD), in the ultraviolet, and visible portions of the spectrum; InSb—array in near infrared; InGaAs—array in near infrared; Hg—Cd—Te—array in mid-infrared and other array detectors.

Array detectors can operate in the focal plane of the optics. Here each detector of the array detects and records the signal from a specific area, x,y. Practical Example B described herein on the gray-level camera provides a further illustration. Different aspects of the embodiments of the present invention are considered in more detail. As is understood by one skilled in the art, standard optical duality implies that each of the preceding configurations can be operated in reverse, exchanging the position of the source and the detector.

The postsample processing, i.e., signal processing performed after a sample had been irradiated, describes an aspect of the present invention. In accordance with another aspect of this invention, significant benefits can result from irradiating a sample with pre-processed radiation, in what is referred to as pre-sample processing. In accordance with an embodiment of the present invention, one or more light sources, capable of providing modulated temporal and/or spatial patterns of input radiation, can be used. These sources are referred to herein as controllable source(s) of radiation, which in general are capable of generating arbitrary combinations of spectral radiation components within a predetermined spectrum range.

Problems associated with the prior art are addressed in accordance with the present invention using a device that in a specific embodiment can be thought of as the reverse of the setup illustrated in FIG. 1A. In particular, one or more broadband radiation sources illuminate the digital micro-mirror array (DMA) 18 and the modulations of the micro-mirrors in the DMA encode the source radiation prior to impinging upon the sample. The reflected radiation is then collected from the sample and directed onto a detector for further processing.

Figure 10:
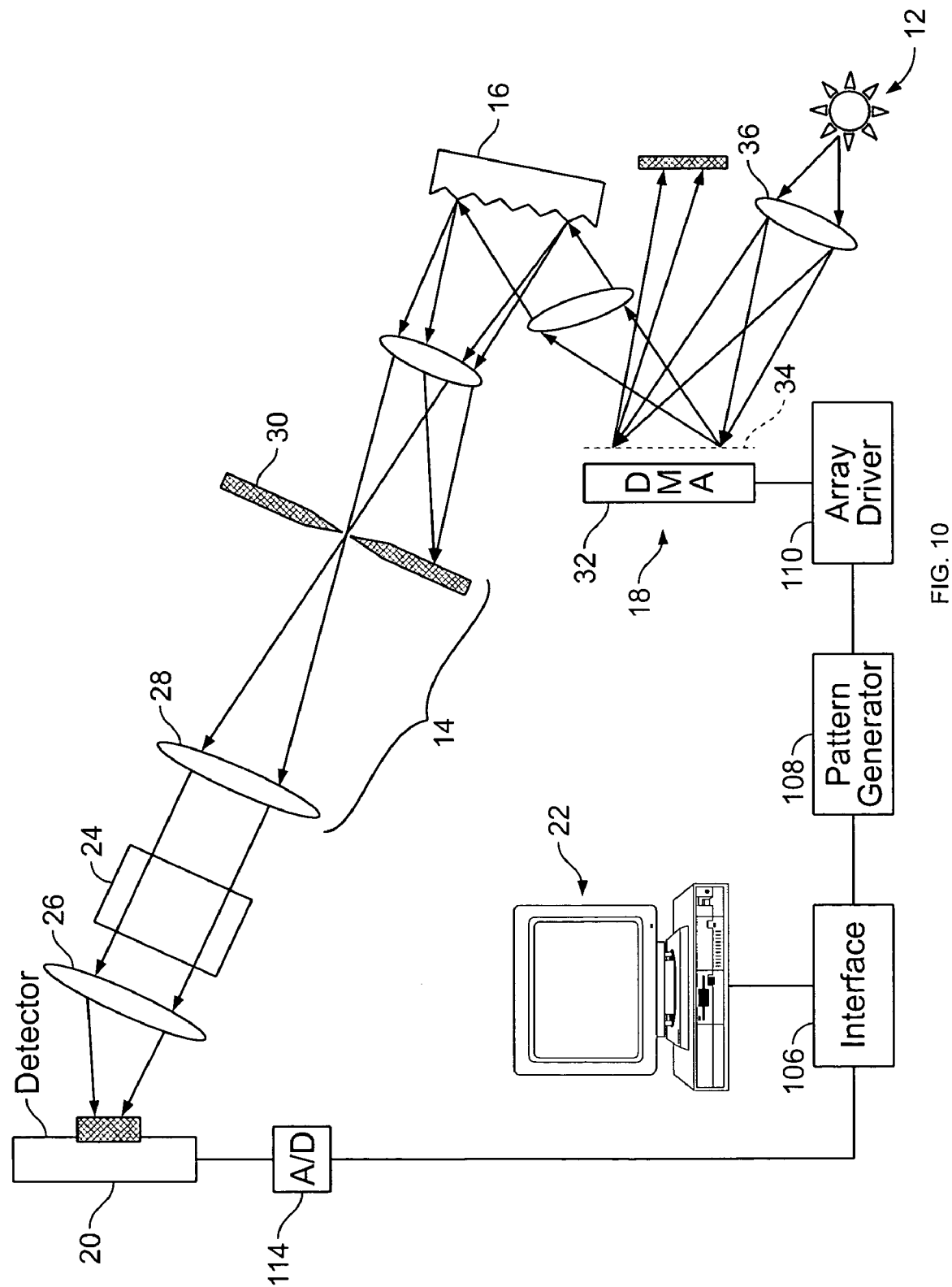
FIG. 10 illustrates in diagram form an apparatus using controllable radiation source.

FIG. 10 illustrates a schematic representation of an apparatus in accordance with the present invention using a controllable radiation source. Generally, the system comprises a broadband radiation source 12, DMA 18, wavelength dispersion device 16, slit assembly 30, detector 20 and control assembly 22.

In particular, control assembly 22 can comprise a conventional personal computer 104, an interface 106, a pattern generator 108, a DMA driver 110, and an analog to digital (A/D) converter 114. Interface 106 operates as a protocol converter enabling communications between the computer 22 and devices 108-114.

Pattern generator 108 can include an EPROM memory device (not shown) which stores the various encoding patterns for array 18, such as the Hadamard encoding pattern discussed herein. In response to control signals from computer 22, generator 108 delivers signals representative of successive patterns to driver 110. More particularly, generator 108 produces output signals to driver 110 indicating the activation pattern of the mirrors in the DMA 18. A/D converter 114 is conventional in nature and receives the voltage signals from detector 20, amplifies these signals as analog input to the converter in order to produce a digital output representative of the voltage signals.

Radiation source 12, grating 16, DMA 18, slit assembly 30 and detector 20 cooperatively define an optical pathway. Radiation from source 12 is passed through a wavelength dispersion device 16, which separates in space different spectrum bands. The desired radiation spectrum can them be shaped by the DMA 18 using the filter arrangement outlined herein. In accordance with an embodiment of the present invention, radiation falling on a particular micro-mirror element can also be encoded with a modulation pattern applied to it. In a specific mode of operating the device, the DMA 18 is activated to reflect radiation in a successive set of encoding patterns, such as Hadamard, Fourier, wavelet or others. The resultant set of spectral components is detected by the detector 20, which provides corresponding output signals. Computer 22 then processes these signals.

Computer 22 initiates an analysis by prompting pattern generator 108 to activate the successive encoding patterns. With each pattern, a set of wavelength components are resolved by grating 16 and after reflection from the DMA 18 is directed onto the detector 20. Along with the activation of encoding patterns, computer 22 also takes readings from the A/D converter 114, by sampling data. These readings enable computer 22 to solve a conventional inverse transform, and thereby eliminate background noise from the readings for analysis.

In summary, the active light source in accordance with an embodiment of the present invention comprises of one or more light sources, from which various spectral bands are selected for transmission, while being modulated with a temporal and/or spatial patterns. The resulting radiation is then directed at a region (or material) of interest to achieve a variety of desired tasks. A brief listing of these tasks include: (a) precise spectral coloring of a scene, for purposes of enhancement of display and photography; (b) precise illumination spectrum to correspond to specific absorption lines of a compound that needs to be detected, or for which it is desirable to have energy absorption and heating, without affecting neighboring compounds (this is the principle of the microwave oven for which the radiation is tuned to be absorbed by water molecules allowing for heating of moist food only); (c) the procedure in (b) can be used to imprint a specific spectral tag on ink or paint, for watermarking, tracking and forgery prevention, acting as a spectral bar code encryption; and (d) the process of light curing to achieve selected chemical reactions is enabled by the tunable light source.

Various other applications are considered herein. Duality allows one to reverse or "turn inside out" any of the post-sample processing configurations described herein, to yield a pre-sample processing configuration. Essentially, in the former case one takes post sample light, separates wavelengths, encodes or modulates each, and detects the result. The dualized version for the latter case is to take source light, separates wavelengths, encode or modulate each, interact with a sample, and detect the result.

Various embodiments of systems for performing post- and pre-sample processing were discussed herein. In accordance with an embodiment of the present invention, the central component of the system is a digital micro-mirror array (DMA), in which individual elements (micro-mirrors) can be controlled separately to either pass along or reject certain radiation components. By the use of appropriately selected modulation patterns, the DMA array can perform various signal processing tasks. In accordance with an embodiment of the present invention, the functionality of the DMAs discussed herein can be generalized using the concept of Spatial Light Modulators (SLMs).

In accordance with an embodiment of the present invention, a 1D, 2D, or 3D SLM is configured to receive any set of radiation components and functions to selectively pass these components to any number of receivers or image planes or collection optics, as the application requires; or to reject, reflect or absorb any input radiation component, so that either it is or is not received by one or more receivers, image planes or collection optics devices. It is appreciated that while in the example discussed herein, the SLM is implemented as a DMA, virtually any array of switched elements can be used in accordance with the present invention.

Generally, an SLM in accordance with the present invention is capable of receiving any number of radiation components, which are then encoded, tagged, identified, modulated or otherwise changed in terms of direction and/or magnitude to provide a unique encodement, tag, identifier or modulation sequence for each radiation component in the set of radiation components, so that subsequent optical receiver(s) or measuring device(s) have the ability to uniquely identify each of the input radiation components and its properties. In a relevant context, such properties include, but are not limited to, irradiance, wavelength, band of frequencies, intensity, power, phase and/or polarization. The tagging of individual radiation components can be accomplished using rate modulation. Thus, different spectral components of the input radiation that have been separated in space using a wavelength dispersion device are then individually encoded by modulating the micro-mirrors of the DMA array at different rates. The encoded radiation components are directed to a single detector, but nevertheless can be analyzed individually using Fourier analysis of the signal from the detector. Other examples for the use of "tagging" are discussed herein.

By modulating the SLM array used in accordance with the present invention, so as to compute inner products with elements of an orthogonal basis, the raw data can be converted directly on the sensor to provide the data in transform coordinates, such as Fourier transform, Wavelet transform, Hadamard, and others. This is because the amount of data collected is so large that it can swamp the processor or result in insufficient bandwidth for storage and transmission. As known in the art, an imaging device can become useless without some compression. As noted herein, for hyper-spectral imaging, a full spectrum (a few hundred data points) is collected for each individual pixel resulting in a data glut. Thus, compression and feature extraction are essential to enable a meaningful image display. It will be appreciated that the resulting data file is typically much smaller, providing significant savings in both storage and processing requirements. A simple example is the block 8×8 Walsh expansion, which is automatically computed by appropriate mirror modulation, the data measured is the actual compressed parameters.

In accordance with an embodiment of the present invention, a sample of material is irradiated with well-chosen bands of radiation that are separately identifiable using modulation to enable an operator to directly measure constituents in the material of interest. This measurement, for example, can be of the protein quantity in a wheat pile, different chemical compounds in human blood, or others. It should be apparent that there is no real limitation on the type of measurements that can be performed, although the sensors, detectors and other specific components of the device, or its spectrum range can differ.

It will be appreciated that the above approach can be generalized to a method of detecting a chemical compound with known absorption lines. In particular, a simple detection mechanism for compounds with known absorption is to use an active illumination system that transmits light (radiation) only in areas of the absorption spectrum of the compound. The resulting reflected light will be weakest where the compound is present, resulting in dark shadows in the image (after processing away ambient light by, for example, subtracting the image before illumination). Clearly, this approach can be used to dynamically track objects in a video scene. For example, a red ball could be tracked in a video sequence having many other red objects, simply by characterizing the red signature of the ball, and tuning the illumination to it, or by processing the refined color discrimination. One of ordinary skill in the art can readily appreciate its usefulness of such capability in interactive TV or video-gaming, machine vision, medical diagnostics, or other related applications. Naturally, similar processing can be applied in the infrared range (or UV) to be combined with infrared cameras to obtain a broad variety of color night vision (or heat vision), tuned to specific imaging tasks. To encode the received spatial radiation components one can use pulse code modulation (PCM), pulse width modulation (PWM), time division multiplexing (TDM) and any other modulation technique that has the property of identifying specific elements of a complex signal or image.

In accordance with an embodiment of the present invention, one can rapidly switch between the tuned light and its complement, such that the difference will display analate of interest with the highest contrast. In addition, it is noted that analate of interest will flicker, enabling detection by the eye. Such inventive approach of the present invention has multiple applications in cancer detection in vivo, on an operating table, and the like.

In accordance with an embodiment of the present invention, the hyper-spectral analysis system and method based on a tuned light system transmits any combination of light wavelengths, e.g., in the range 450 nm-850 nm trans-illuminating H & E stained micro-array tissue sections of normal and malignant colon with a microscope, such as a Nikon Biophot microscope. Hyper-spectral pictures of tissues obtained with a charge coupled device (CCD) camera, such as a Sensovation Samba QS-34 (see http://www.sensovation.com), are captured by a computer and analyzed mathematically to discriminate between normal and malignant cells and tissues. Preferably, the method includes a training phase and a testing phase.

An illustrative example of a training phase can consist of a data collection in which 61 hyper-spectral pictures are collected at 400× magnification: 15 pictures of normal colon tissue from 10 different patients and 46 pictures of malignant colon tissue from 42 different patients.

The hyper-spectral analysis system and method of the present invention normalizes, compresses and analyzes the spectra of each pixel to discriminate between gland nuclei, gland cytoplasm and lamina propria/lumens as described herein. The hyper-spectral analysis system and method automatically extracts the pixel spectra and classifies the extracted pixel spectra as nuclei.

In accordance with an embodiment of the present invention, the hyper-spectral analysis method and system finds spectral features separating normal nuclei from abnormal nuclei. Once the spectral features are found, a testing phase can be conducted in which samples of unknown status are imaged, and the status (i.e. normal vs. abnormal) is determined by the hyper-spectral analysis system and method of the present invention.

In accordance with an embodiment of the present invention, each hyper-spectral image is a 3-D data cube. In an exemplary embodiment, each datacube has spatial coordinates x (491 pixels) and y (653 pixels), and spectral coordinate z (128 pixels) (for a total of 41 million pixels) representing transmitted spectra. To find the absorbed light, in accordance with an embodiment, the present invention calculates the logarithm of spectra so that Beer's law can be applied.

In accordance with an embodiment of the present invention, the data is de-noised and reduced from the original 128 spectra to 64 spectral samples in the range 480-600 nm. In accordance with an aspect of the present invention, the hyper-spectral analysis method and system normalizes, compresses and analyzes as follows:

1) the spectra are classified or labeled as belonging to one of three classes: gland nuclei, gland cytoplasm, or lamina propria/lumens;

2) discriminating spectral signatures are found using a local discriminant basis algorithm or other comparable algorithm;

3) nuclei spectra are extracted using a nearest neighbor algorithm (e.g. 10-nearest-neighbors) or other comparable algorithm; and 4) three "scales" of discrimination are performed: (a) discrimination between normal and abnormal nuclei aggregates (patches); (b) discrimination between normal and abnormal data cubes; (c) evaluate mean classification of data cube spectra patches; and (d) discrimination between normal and abnormal biopsies.

In discriminating normal and abnormal nuclei aggregates (patches), the hyper-spectral analysis method and system extracts sets of spectra (patches) belonging to the same nucleus, or neighboring nuclei groups and generates the following support vector machine classifiers: a frequency-wise standard deviation classifier, two principal component classifiers, and a final classifier based on these three classifiers.

In discriminating normal and abnormal patches and data cubes, the hyper-spectral analysis system and method randomly collects a training set of 2440 patches from 61 datacubes (excluding adenomas) using the following criteria: any patch extracted from a data cube with "no abnormal" nuclei is classified as "normal" and any patch extracted from a data cube with "any abnormal" nuclei is classified as "abnormal".

For evaluating normal and abnormal patches and data cubes, the hyper-spectral analysis system and method builds test sets of 1800 patches by randomly selecting 30 patches from 67 data cubes (15 normal, 45 malignant, 7 adenomas) and evaluating the classifier.

In discriminating normal and abnormal biopsies, the hyper-spectral analysis method and system sets a threshold of 0.5 on the average outcome of the classifier on the nuclei selected in each biopsy, in order to classify the biopsies.

The term frequency as used herein means the speed of light divided by wavelength. In measuring the spectrum, each pixel is assumed as having 128 dimensional vector, thereby resulting in different sets of coordinates in this 128 dimensional space. One set could be $B_R = \{\delta(\nu_0 + k\Delta\nu)\}_{k=1,\ldots,128}$, where the coordinates of a signal $f$ in such a basis are simply the samples $$f(\nu_0 + k\Delta\nu) = \langle f, \delta(\nu_0 + k\Delta\nu) \rangle$$

These measurement correspond naturally to a raster scan of the sample: for each k, light at frequency $\nu_0 + k\Delta\nu$ is illuminated through the sample and the CCD registers the number of photons at that frequency transmitted through the sample. However, since the total amount of light of the source is constant, the amount of light at each frequency is, roughly, $$\frac{1}{\text{total number of wavelengths}},$$

which in our case means 1/128 of the total light. To obtain a good signal to noise ratio, the system needs to integrate for a very long time because of the selected basis.

In accordance with an embodiment of the present invention, the hyper-spectral system and method utilizes a basis of Walsh packets. An orthogonal basis different from $B_R$, the system denotes it as $B_W$, consisting of vectors $w_i$, each vector (besides one measuring the mean of the signal) having half entries equal to 1 and half entries equal to −1. The present system hierarchically organizes the vectors by scale, such that for each j between 0 and $\log_2(N)$ (N being the length of the signal), the L dimensional space, spanned by signals constant on dyadic intervals at scale $2^j$, is spanned by exactly L packets.

It is appreciated that the measurement of $\langle f, w_i \rangle$ is physically impossible since this would involve illuminating light having spectral shape $w_i$ where certain $w_i$ are partly negative. To remedy to this, the present system and method re-characterizes or writes $w_i$ as $w_i = H_i^0 - H_i^1$ where the functions $H_i$ are positive. Accordingly, the illuminated light has spectral shape $H_i$, thus measuring $\langle f, H_i^x \rangle$, x=0,1 and then obtain $$\langle f, w_i \rangle = \langle f, H_i^0 - H_i^1 \rangle = \langle f, H_i^0 \rangle - \langle f, H_i^1 \rangle.$$

This technique is well-known as Hadamard spectroscopy, an example of the more general idea of multiplexing. It is appreciated that there is an orthogonal transformation (or, dually, a change of orthogonal bases) mapping the Hadamard coefficient bijective to the raster scan coefficients. These are just two representations of the same signal on two different orthogonal bases. Physically, however, the two measurements are very different as each pattern $H_i^x$ carries energy equal to ½ of the energy of source, as opposed to the energy of a raster scan packet, which is $$\frac{1}{\text{total number of wavelengths}}.$$

This improves the signal to noise ratio of the coefficients of a Hadamard scan by a factor $\sqrt{(\text{totalnumberoffrequencies})}$ or for fixed signal to noise ratio, the scan is performed faster by this factor.

However, there remains one problem with the Hadamard scan. Since the spectra are smooth and due to the structure of the Hadamard patterns, a priori, the signal to noise ratio of the Walsh coefficients $\langle f, w_i \rangle$ decreases rapidly with the index $i$. This is not desirable, since it can be artificially weighting certain information in the spectra, and does not maximize, for a given integration time, the number of photons reaching the sensor for certain patterns. To correct this problem, in accordance with an embodiment of the present invention, the hyper-spectral analysis system and method performs a randomized Hadamard scan which essentially randomly shuffles the frequency axis by a bijective map $\rho$: the shuffled spectra $f(\rho)$ are no longer smooth, and the size and signal to noise ratio of all the coefficients $\langle f(\rho), w_i \rangle = \langle f, w_i(\rho^{-1}) \rangle$ are almost uniform. The new patterns $w_i(\rho^{-1})$ look like noise, but are treated as another orthogonal basis by the present invention. There is a simple orthogonal transformation mapping this basis into the old $w_i$ basis and into the raster basis $\delta_k$, thus allowing transformation of the coefficients from one basis onto another basis.

In accordance with an embodiment of the present invention, the hyper-spectral analysis system and method acquires data by performing a randomized Hadamard scan with a fixed random permutation of the frequencies for all measurements.

In principal component analysis, in accordance with an embodiment of the present invention, the hyper-spectral analysis system and method considers that the spectrum associated with each pixel to be a point in $R^{128}$, 128 dimensional Euclidean space and orders the multiple spectra in a matrix, one spectrum per row. If X is the obtained matrix, it can be rewritten in the form X=USV where U and V are orthogonal matrices and S is a diagonal matrix. The diagonal entries of S are the singular values of X and are ordered in decreasing order, while the columns of V are the associated principal components. The first column $v_i$ of V is the axis of maximum variance of the data, the second column $v_2$ of V is the axis of maximum variance for the projection of the data onto the subspace orthogonal to $v_1$, and so on: $v_j$ is the axis of maximum variance for the projection of the data onto the subspace orthogonal to $[v_1, \ldots, v_{j-1}]$.

In accordance with an embodiment of the present invention, the hyper-spectral analysis method and system employs Local Discriminant Bases (LDB) which apply naturally to a family of labeled vectors that represents smoothly varying functions, for example spectra and sounds. If these labeled correspond to clusters in the data, the vectors can be very high dimensional and clustering or non-linear separation methods between classes can be very expensive if not unfeasible. The goal of LDB is to find directions in these high dimensional spaces such that the data projected onto these directions are still well-discriminated (i.e., readily distinguishable). Then discriminating the low-dimensional projections of the data can be expected to achieve results comparable if not superior to discriminating in the high-dimensional space with all the advantages and tools available in the lower dimensional space. While discriminating features are preserved by the LDB, the non-discriminating features are removed, thereby de-noising the data, at least with respect to the discrimination task.

The features search in the high dimensional space is notoriously difficult. One way some local discriminant bases alleviate some aspects of the "curse of dimensionality" is to search the sub-optimal projections among hierarchically well-organized dictionaries of wavelet or Fourier packets. It is appreciated that there are fast algorithms to search through them and compute the projections onto ensembles of these patterns. In accordance with an embodiment of the present invention, the hyper-spectral analysis method and system utilizes a version of local discriminant bases that uses arbitrary Haar packet decompositions of the phase-space, but other, even less flexible, wavelet dictionaries can be used as well. In all cases the discriminating features have properties of smoothness and locality.

In accordance with an embodiment of the present invention, the hyper-spectral analysis method and system employs support vector machine (SVM) techniques to solve discrimination problems by finding a function that generally fits the prescribed labels and stays as simple as possible, thereby guaranteeing good generalization error and preventing overfitting problems. The balance between fitting the labels and some notion of complexity of the classifier is crucial when one is working with a relatively small number of samples compared to the dimension of the space in which these samples are given. Unfortunately, the computations for SVM can become quite difficult in high-dimensions, so in practice it is necessary to lower the dimensionality of the data before applying these techniques.

In accordance with an embodiment of the present invention, the hyper-spectral analysis method for characterizing or distinguishing diverse elements within hyper-spectral images, comprising the steps of extracting a plurality of patches of pixels from within the hyper-spectral images as being patches around pixels of the elements to be characterized or distinguished; computing the statistics of spectra for each patch of pixels, a first classifier from frequency-wise standard deviation of the spectra in each patch, a set of second classifiers from principal components of the spectral in each patch, and a classifier based on the output of the first classifier and at least one of the second classifiers; and characterizing or distinguishing the elements based on the output of at least one of the classifiers, preferably the combined classifier.

In accordance with an embodiment of the present invention, a hyper-spectral analysis system for characterizing or distinguishing diverse elements within hyper-spectral images, comprising an extracting module for extracting a plurality of patches of pixels from within the hyper-spectral images as being patches around pixels of the elements to be characterized or distinguished; a computing module for computing the statistics of spectra for each patch of pixels, a first classifier from frequency-wise standard deviation of the spectra in each patch, a set of second classifiers from principal components of the spectra in each patch, and a combined classifier based on the output of the first classifier and at least one of the second classifiers; and a characterization module for characterizing or distinguishing the elements based on the output of at least one of the classifiers.

Figure 11:
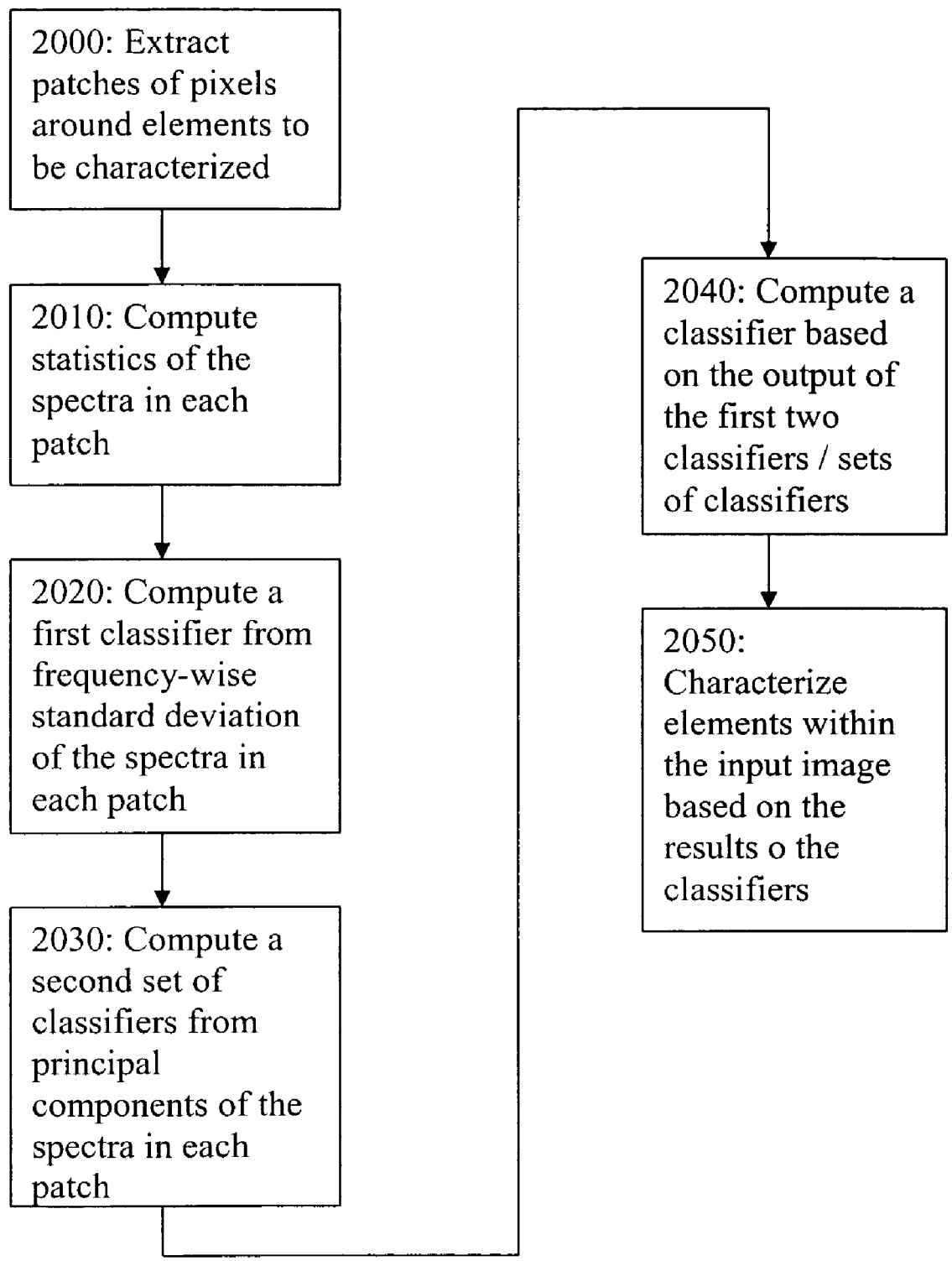
FIG. 11 is a flow chart describing the steps of the hyper-spectral analysis method in accordance with an embodiment of the present invention.

The operation of the hyper-spectral analysis method in accordance with an embodiment of the present invention is now described in conjunction with a flow chart depicted in FIG. 11. In step 2000, the hyper-spectral analysis system extracts the nuclei aggregates from each data cube. That is, the system extracts from each datacube groups of neighboring nuclei, collecting about 40 (in general overlapping) square patches $P_i$ of size 128 by 128 pixels from each datacube or image. For each patch $P_i$ the system considers those nuclei spectra $\{N_{ik}\}_k$ in $P_i$ such that a square patch of size 4 by 4 around the pixel contains at least 90% nuclei spectra. If $\{N_{ik}\}_k$ contains at least 1000 nuclei (this is about 6% of the surface of the patch $P_i$) then the present system keeps $P_i$ and $\{N_{ik}\}_k$ for classification. In one exemplary dataset, the present system yielded a total of 2440 patches with corresponding nuclei spectra $\{N_{ik}\}_k$.

In step 2010, the hyper-spectral analysis system computes the statistics of the spectra for each nuclei aggregate. For each set of nuclei spectra $\{N_{ik}\}_k$ in the patch $P_i$, the present system computes the mean spectrum and, for each spectral band, the standard deviation of the band, as well as the first 10 principal components. Often the mean and the first few principal components of normal and abnormal nuclei are similar, but the "frequency-wise" standard deviations and some of the higher order principal components show statistically significant differences.

In steps 2020 and 2030, the hyper-spectral system builds or constructs three classifiers: $C_1$, $C_2^I$ $C_2^{II}$. The first classifier takes advantage of the differences in the standard deviations, whereas the second and third classifier use the principal components. The classifiers are similarly constructed and combined in a nonlinear voting manner. In step 2020, the hyper-spectral analysis system computes the first classifier $C_1$ from the frequency-wise standard deviation of the spectra in each aggregate. Since the standard deviations are smooth functions of the frequency index, the present system employs LDB as described herein to find the features that "best" discriminate between the frequency-wise standard deviations of groups of normal nuclei and the frequency-wise standard deviations of groups of abnormal nuclei. The present system keeps the first four such features and projects orthogonally all the standard deviations onto these four features. In the four dimensional space onto which the standard deviations were projected, the present system employs a non-linear support vector machine (SVM) to separate the family of standard deviations corresponding to groups of normal nuclei from those corresponding to groups of abnormal nuclei. The present system optimizes over the parameters of the SVM by 10-fold cross validation in order to not overfit the data. At the same time, the present system weights the classifier by penalizing misclassifications of normal tissue more than misclassifications of abnormal tissue. The hyper-spectral analysis system finds the "best" classifier $C_1$ under these constraints.

In step 2030, the hyper-spectral analysis system computes a second set of classifiers from the principal component of the spectra in each aggregate. This is analogous to the construction of $C_1$, except that the present system applies it to each principal component. Let j=1, ..., 10 be the index for the first ten principal components. For each k, the present system considers the j-th principal component of each group $\{N_{ik}\}_k$, to obtain 812 k-th principal components, some relative to normal nuclei spectra and some relative to abnormal nuclei spectra. Since the principal component is a smooth function of the frequency, the present system employs the LDB to find features which discriminate between the principal components of normal and abnormal groups. The present system keeps the first four features and projects the principal components onto the four dimensional space spanned by these first four features. In this 4-dimensional subspace, the present system employs SVMs, optimizing the parameters under cross-validation. For each k, the present system obtains a classifier, and a posteriori, the present system selects the k that gives the "best" result. In an exemplary embodiment, the $4^{th}$ and $6^{th}$ principal components provided the best result and was respectively denoted as classifiers $C_2^I$ and $C_2^{II}$.

In step 2040, the hyper-spectral analysis system computes a classifier from the output of the two sets of classifiers to combine the classifiers $C_1$, $C_2^I$ and $C_2^{II}$. It is appreciated that these classifiers are "soft", in the sense that each of them returns a real number (mostly in $[-1,1]$) whose sign is determinative of the classification, i.e., normal or abnormal. Before taking the "signum" of the classifier, the present system views each classifier as a map of a patch $P_i$ to $C_1(P_i)$ ($C_2^I(P_i)$ and $C_2^{II}(P_i)$ respectively) with the real numbers (concentrated around the values $-1$ and $+1$). The present system can view the classifiers as mapping each patch $P_i$ onto the 3-dimensional vector ($C_1(P_i)$, $C_2^I(P_i)$, $C_2^{II}(P_i)$). The present system then looks for a classifier in this space of outputs of the two sets of classifiers and utilizes SVMs to optimize the parameters under cross validation.

In step 2050, the hyper-spectral system characterizes the elements within the input image based on the results of the classifiers, preferably the combined classifier.

In accordance with an embodiment of the present invention, the hyper-spectral analysis method for characterizing or distinguishing diverse elements within hyper-spectral images, comprises the steps of extracting a plurality of patches of pixels from within the hyper-spectral images as being patches around pixels of the elements to be characterized or distinguished; computing the statistics of selected spectral features for each patch of pixels, a first classifier from feature-wise standard deviation of the selected spectral features in each patch, a set of second classifiers from principal components of the spectral in each patch, and a classifier based on the output of the first classifier and at least one of the second classifiers; and characterizing or distinguishing the elements based on the output of at least one of the classifiers, preferably the combined classifier.

In accordance with an embodiment of the present invention, a computer readable medium comprises code for characterizing diverse elements within hyper-spectral images, the code comprises instructions for extracting a plurality of patches of pixels from within the hyper-spectral images as being patches around pixels of the elements to be characterized or distinguished; computing the statistics of selected spectral features for each patch of pixels, a first classifier from feature-wise standard deviation of the selected spectral features in each patch, a set of second classifiers from principal components of the spectral in each patch, and a classifier based on the output of the first classifier and at least one of the second classifiers; and characterizing or distinguishing the elements based on the output of at least one of the classifiers, preferably the combined classifier.

In accordance with an embodiment of the present invention, a hyper-spectral analysis system for characterizing or distinguishing diverse elements within hyper-spectral images, comprises an extracting module for extracting a plurality of patches of pixels from within the hyper-spectral images as being patches around pixels of the elements to be characterized or distinguished; a computing module for computing the statistics of spectra for each patch of pixels, a first classifier from frequency-wise standard deviation of the spectra in each patch, a set of second classifiers from principal components of the spectra in each patch, and a combined classifier based on the output of the first classifier and at least one of the second classifiers; and a characterization module for characterizing or distinguishing the elements based on the output of at least one of the classifiers.

We will now turn attention to another embodiment related to those discussed hereinabove. In this embodiment, a first step is to compress and reduce the dimensionality of the data available, without discarding relevant information. Depending on the data and any assumption/model for it, one can employ different signal processing techniques standard in the art in order to efficiently compress the data. Illustrative examples will be given herein. A second step is a classification or a regression task. In this step we look for features which enhance discrimination among different classes or which serve as good inputs for regression algorithm(s).

In many important applications, such as astronomy or medical imaging, there is a great amount of a priori knowledge on the type of hyperspectral data at hand. For example there are good models for each layer $I_i(x,y)$, and for each spectrum $s(x,y)=I(x,y)$. Each $I_i$ is an image to which standard image compression and denoising techniques can be applied. These technique include but are not limited to Fourier, wavelet, wavelet packet, curvelet and ridgelet based compression and denoising. Any of these techniques, in any combination, can be applied to each layer $I_i$ for compression and/or denoising of the layer. Also, each spectrum $s(x,y)$, being generally a smooth function, is amenable to one-dimensional compression and denoising and these can be applied as well. In addition, one can perform three dimensional compression on the dataset $I_i(x,y)$, taking into account correlation, joint smoothness and joint structural properties in the three dimensions, and compressing or denoising using for example a basis (e.g. found with a best basis wavelet packet algorithm) for the specific task and dataset at hand.

In an embodiment of the present invention, each spectrum is a point in a space of a certain dimension. For illustration assume a 128-dimensional space. Often the ensemble of all spectra in a data cube, or even in all data cubes, are not randomly scattered in 128 dimensions, but tend to be concentrated around a sub-manifold of low intrinsic dimension. For example, one parameter may be the total energy of the spectrum, and two others could be the absorbance of hematoxylin and eosin stains, respectively, at particular wavelengths. These three parameters already would contain a lot of the information about each spectrum, and in fact this is more or less the only information that a pathologist has, looking at one of the samples in the microscope. In our example we are measuring 128 numbers, but far fewer parameters would sufficient to identify a spectrum. In the present invention, we perform dimensionality reduction in order to reduce the number of parameters to be processed to solve the discrimination problem at hand.

We will describe a few of the many approaches to solve this problem, broadly subdividing them into linear and nonlinear techniques. Linear techniques in general project the data on some low-dimensional subspace, so that important features of the data are preserved, where the measure of importance has to be. defined, and is often application-specific. Linear techniques include random projections, principal component analysis, partial least squares, several variations of these, and many others. In the first two techniques, the important features of the data that one seeks to preserve are essentially the pairwise distances, in the third a function (e.g. labels) on the the data is given and is taken into account in the computation of the subspace.

Local Discriminant Bases (LDB) apply to a family of labeled vectors that represent smoothly varying functions, for example spectra and sounds. The labels of these vectors may correspond to more or less well-defined clusters in the data, though determining those labels via clustering or other unsupervised non-linear separation methods can be very expensive, if not unfeasible, due to the high dimensionality of the vectors. The goal of LDB is to find directions in these high dimensional spaces such that the data projected onto these directions are still well-discriminated. Then discriminating the low dimensional projections of the data should be almost as good as discriminating in high dimension with all the advantages and tools available in lower dimensional spaces. At the same time, while discriminating features are preserved, confounding features are removed, thus denoising the data with respect to the discrimination task at hand.

The search for features in high dimensional spaces is notoriously difficult. One way LDB alleviate some aspects of the "curse of dimensionality" is by searching sub-optimal projections among hierarchically well-organized dictionaries of wavelet or Fourier packets. There are fast algorithms with which perform such a search and to compute the projections onto ensembles of these patterns. We use a version of LDB that uses arbitrary Haar packet decompositions of the phase-space, but other, even less flexible, wavelet dictionaries would work as well.

Nonlinear techniques include local linear embeddinge (LLE), Laplacian Eigenmaps, Hessian Eigenmaps and Diffusion maps, which together have received a lot of attention in the last few years. Many of these techniques are based on the idea that the data lies on some manifold in a high dimensional space, but with the intrinsic dimensionality of the manifold actually being quite low due to constraints in the data allowing for a description by few parameters.

Here we would like to illustrate the use of Principal Component Analysis and Diffusion Maps applied to this particular dataset. Similar results would be expected in the analysis of other types of hyperspectral data, for example astronomical hyperspectral data.

We consider a data cube with the spectra centered around their mean, and we compute the principal components of the centered spectra contained in the cube. This is computationally quite expensive, so in practice we select a random subset of spectra and we compute the principal components for that subset. The top few principal components often capture most of the energy of the data. In particular, inner products and pair-wise Euclidean distances can be computed on the projection onto the top few principal components with very good precision (and less sensitivity to noise!).

If the low-dimensional set on which the spectra actually lie is quite nonlinear, in general there will not be a linear subspace onto which the data can be meaningfully projected. So while the principal components analysis does show that the intrinsic dimensionality of the spectral data is rather small, it does not help in extracting good parameters and understanding clusters in the spectral space.

We adopt a nonlinear technique based on diffusion in order to better understand the structure of the data. Instead of looking at the directions of maximum variability, as principal component analysis does, the technique of the present invention looks at each spectrum, and at the connections between each spectrum with its very closest neighbors. It then looks at how these connections allow a random walker to explore the data. It is appreciated that the connections inside each cluster will be numerous and strong, and connections across clusters will be fewer and weaker. It is then possible to construct a map from spectral space to Euclidean space such that the Euclidean distance between two points measured in the range is equal to the "diffusion distance" between those two points on the original data set. Moreover, this map has the form $$s \to (\Phi_1(x), \Phi_2(x), \ldots, \Phi_k(x)),$$

where the functions $\Phi$ are defined on the set of spectra, and are eigenfunctions of a Laplacian defined on the set of spectra itself, interpreted as a graph. Details and discussion of these ideas can be found in U.S. patent application Ser. No. 11/165,633, incorporated herein by reference, in its entirety.

When we apply this technique to the spectra in a data cube, we get a much more meaningful description of the data, and in fact various eigenfunctions $\Phi_i$ separate very well between different tissue types. This is a consequence of the staining, which we had reasonably expected as being one of the most important parameters.

The parameters discovered with this algorithm allow one to "virtually stain" the biopsy, and can be mapped from biopsy to biopsy in order to resolve normalization issues that greatly affect global distances between points.

This technique can be used effectively for segmentation of the data cube. Spectral features, together with spatial features (for example filter responses to various texture or edge filters) can be clustered using the eigenvectors of the diffusion process on these features, and effectively find clusters corresponding to segmentations of the data cube.

The goal of the analysis of a set of hyper-spectral images may be classification or regression. Depending on the application and/or goal, one may want to classify single spectra, or groups of spectra around particular locations. For example, in astronomy one may want to classify galaxy types based on their spatial configuration and spectral characteristics. In our example, we want to discriminate between normal nuclei and abnormal (malignant) nuclei in various regions of the tissue.

In general, seeking features in the full 3-dimensional data cube can lead to good results, since the various spatial and spectral correlations help in denoising the data, and can be used to define features of local aggregates which can be much more meaningful than features of a single spectrum.

Given a set of points $\{x_i\}_i$ with corresponding labels $\{l_i\}_i$, and given a test point y, the k-nearest neighbor classifier assigns the label $l_i^*$ to y as follows. The k closest points $\{x_{i_1}, \ldots, x_{i_k}\}$ to y are found. Then the most frequent label $l_i^*$ among $\{l_{i_1}, \ldots, l_{i_k}\}$ is assigned to y. Ties are broken randomly. The 1-nearest neighbor classifier has many good theoretical properties, and performs extremely well when the number of training points is large. When the number of points is small for the dimension in which the points are given, then k-nearest neighbor classifiers with k>1 may be preferable since the choice k>1 corresponds to regularizing the data in a particular way.

Given a set of points $\{x_i\}_i$ and a function f defined on these points, and an integer k>0, PLS computes a set of orthonormal vectors $\{v_1, \ldots, v_k\}$, and a k-dimensional vector w, and then extrapolates f at y by first computing P(y), the projection of y onto the subspace spanned by $\{v_1, \ldots, v_k\}$ and then letting f(y)=<y,w>. The computation of the vectors $v_1, \ldots, v_k$ is done in the following way. Once the first i vectors $v_1, \ldots, v_i$ have been constructed, $v_{i+1}$ is the vector that solves the problem $$\max_{\substack{\|v\|=1 \\ v \perp \{v_1, \ldots, v_i\}}} Corr^2\left(f, \sum_i (v)_1 x_1\right) Var\left(\sum_1 (v)_1 x_1\right)$$

where $(v)_l$ denotes the l-th coordinate of v, and where for i=0 we consider the maximization over all v of norm 1. Once the k vectors $\{v_i\}_i$ have been found, the data is projected onto the subspace spanned by these vectors and linear regression is used in that subspace. The projection has the goal of denoising the data but in such a way as to preserve directions that have strong linear correlation with the function to be predicted.

We now describe in detail another embodiment for discriminating between normal and abnormal biopsy data cubes. Using a tuned light source of the present invention, we transilluminate hematoxylin and eosin (H & E) stained microarray tissue sections with arbitrary combinations of light frequencies, ranging from about 440 nm to about 700 nm, through a Nikon Biophot microscope. To collect the initial data we used the flexibility of the light source to implement a randomized version of the standard Hadamard multiplexing for spectra measurement, in order to reduce noise and biases in the signal-to-noise ratios of the collected data. Hyperspectral tissue images are collected with a CCD camera (Sensovation) and are analyzed mathematically with a PC, using algorithms written in Matlab.

In one exemplary embodiment, we take 137 (66 normal, 71 malignant) hyperspectral gray scale images at 400× magnification are derived from, respectively, 58 and 62 different tissue microarray biopsies. Each measurement yields a data cube C, which is a set $\{I_i\}_{i=1 \ldots 128}$ of images, each of which 495 by 656 pixels. The intensity of the pixel $I_i(x,y)$ ideally represents the transmitted light at location (x,y) when the i-th light pattern is shone through the sample. The measurement of the hyperspectral image is subject to noise, which is roughly independent of the intensity of light shown through the sample. In order to maximize the signal-to-noise ratio of the measurement of each $I_i$, given a fixed integration time, one needs to maximize the amount of light shone through the sample. The flexibility of the instrument allows for shining arbitrary patterns $\psi_i$ of light, in the form $$\psi_i(v) = \sum_{j=1}^{N} \epsilon_{ij} \delta_j(v) \quad (1)$$

where $\epsilon_i \in \{0,1\}$ and $\delta_i$ represents approximately a δ-function at frequency of index i (and N=128 in our experiment, but the instrument would allow up to N=1024).

Hence we can think of $I_i(x,y)$ as the value of the inner product $<f(x,y,v), \psi_i(v)>v$, where f(x,y,v) is the transmittance of the sample at location (x,y) and frequency v.

A raster scan consists in shining the sequence $\{\psi_i\}=\{\delta_i\}$. In this case the energy of light shone through for each $I_i$ will be of the order of $E_0/N$, $E_0$ being the intensity of the light source. Hence, reasonable signal-to-noise ratios can be obtained only by integrating for a long time.

Multiplexing allows a much faster scan, for a given signal-to-noise ratio, and consists in shining a sequence of Hadamard patterns $\{\psi_i^H\}_{i=1, \ldots, N}$. These patterns have the property that for each i there are N/2 non-zero $\epsilon_i$'s in Equation (1) (so that the energy of the light shining through the sample is about $E_0/2$ for the measurement of each $I_i$), and also these patterns are quite independent. These patterns have a multi-scale structure, in the sense that the index set $\{1, \ldots, N\}$ can be split into subsets $\{J_1, \ldots, J_{log\ 2N}\}$ such that the patterns in each subsets are constant on dyadic intervals at a certain scale. However, it turns out that in this way the signal-to-noise ratio is not uniformly distributed among the measurements. This is a consequence of the smoothness of the spectra to be measured and of the structure of the system of Hadamard functions, which implies a priori a decay of $|<f,\psi_j^H>|$ as a function of j. To spread the signal-to-noise ratio uniformly among the coefficients, we consider randomized Hadamard functions, which we obtain by building a random bijection m: $\{1, \ldots, N\} \rightarrow \{1, \ldots, N\}$ and considering $\psi_i^{RH}(v) = \psi^H(m(v))$. The measurements obtained in this way are all of comparable size, allowing to collect more photons overall for a given total measurement time, and thus reducing the signal to noise ratio of the measurements. We compute this random bijection once and use the induced shuffling in all of our measurements. The change of variable m simply induces an orthogonal transformation between $\{\psi_i^H\}$ and $\{\psi_i^{RH}\}$ and hence for example it can be inverted to recover Hadamard measurements, or raster scan measurements The algorithm discriminates between normal and abnormal data cubes. In fact, it would be more useful to be able to classify normal and abnormal (malignant) regions in each sample. This would be particularly important in order to be able to spot abnormal (malignant) regions, which are small and/or only partially present in the sample in question.

The way a trained pathologist would work in analyzing these samples is mainly through pattern recognition. He would look for characteristic structures of large ensembles of cells, such as the structure of glands, their shape, size, and to smaller details such as the shape, size, density and granularity of the nuclei. This kind of pattern analysis is mainly based on rather large scale features, and it could yield inaccurate results on smaller regions.

The algorithm of the present invention generates a classifier for square regions, or patches, with edges of a certain length l which are "admissible", in the sense that they contain a certain density of nuclei, as specified below. Each data cube or sample will contain several such "admissible" patches, each of them roughly centered around a nucleus, and of size about the size of the nucleus. Each patch can be viewed as a cloud of $l^2$ spectral vectors in $R^{128}$. A whole slide is then classified by voting among the classifications of the patches in that slide.

In accordance with an embodiment of the present invention, the algorithm is divided into the following building blocks:

Nuclei identification

Collection of admissible patches.

Construction of the classifier based on the mean of the nuclei spectra in each patch.

In the step of nuclei identification, the first task is to extract the nuclei spectra from a data cube. This is essentially a tissue classification task, which can be easily accomplished since the H&E stain used for the preparation of the slides differentiates between nuclei and the other tissue components. The spectral signatures are then sought that allow one to discriminate the spectra of nuclei from all the other spectra. In order to do this, about 3,000 spectra from two distinct data cubes were selected, about one third of which belonged to each of three different classes: {nuclei, cytoplasm, lamina propria/other}. Let these samples be denoted by $$\{\{v_{i,l}\}_i\}_{l \in \{nuclei, cytoplasm, lamina\,propria\}} \subset R^{128}.$$

The set of spectra is normalized so that each spectrum has $L^2$-norm, or energy, equal to 1:

$$\tilde{v}_{i,1} = \frac{v_{i,1}}{\|v_{i,1}\|_2}.$$

LDB on $v_{i,l}$ is used to find features that best discriminate among the different classes. In general one will find that some number of spectral signatures (say, for example, 4 spectral signatures) are enough to discriminate among the various tissue types, in particular they are enough to discriminate well the nuclei spectra from all the others. The (normalized) training set is then projected onto these, e.g., 4 features, to classify a spectrum from any data cube; the spectrum is normalized and projected onto these 4 features. On this projection, a 15-nearest-neighbor classifier or similar algorithm can be used to identify to which of the three classes the spectrum belongs. Notice that the dimensionality reduction has a denoising effect on the spectra, thus regularizing the distance computations used by the nearest-neighbor algorithm used to classify in the appropriate low-dimensional subspace. Let us denote by $C_{tissue}$ the classifier that computes this projection and classifies into tissue types as described herein. The performance of the classifier $C_{tissue}$ is quite good, uniformly over all datacubes. Mistakes are isolated and can be easily removed by voting among the spatial (x,y) neighbors. From henceforth a spectrum is declared as a nucleus spectrum if it is classified as a nucleus spectrum by $C_{tissue}$.

It is important to remark at this point that the instrument of the present invention is able to directly measure the projection of the spectrum onto the LDB light patterns by shining exactly these 4 patterns of light through the sample. The results of these measurements can be provided immediately to the nearest neighbor classifier. This saves the millions of CPU operations necessary to project the data onto these features. The flexibility of the device of the present invention essentially allows one to move these computations from the computer to the instrument itself, essentially performing an "ad hoc" experiment that measures exactly the quantities of interest.

In the step of collection of admissible patches, now that the nuclei spectra are identified, the desired patches to be classified are defined as follows. A patch is a subset of a datacube of the form $Q_{x_0,y_0}^l \times S$ where $Q_{x_0,y_0}^l$ is a square of side l pixels long, centered at $(x_0,y_0)$ and S denotes the complete spectral range. A patch is admissible if it contains at least $8/10\, l^2$ nuclei pixels. From henceforth, each patch simply as a collection of the nuclei spectra it contains, hence as a cloud in $R^{|S|}$ (with $|S|=128$ in our specific case).

Different sets of patches were considered, corresponding to l=32, 64, and 128, and the results improved with the patch size. However, since they are already very good for l=32 (this size corresponds roughly to the size of a single nucleus), the results corresponding to l=32 as presented herein.

The set of patches considered consisted of 2440 patches of size l=128, collected randomly, 30 per slide. We denote by $\{N_{i,k}\}_{k \in K_i}$ the set of nuclei spectra in the i-th patch $P_i$.

In the step of construction of the classifier based on the mean of the nuclei spectra in each patch, for each admissible patch $P_i$ collected, the mean of the nuclei spectra $\{N_{i,k}\}_k$ were computed and normalize to unit energy. The label (normal or abnormal) attached to the patch is transferred to the corresponding mean nucleus spectrum. We used PLS, keeping k=15 top vectors, and we ran 50 rounds of 10-fold cross-validation to make sure that the present system was not overfitting.

To classify biopsies, several admissible random patches were collected and each biopsy was classified. A biopsy is considered normal if the majority of patches are classified as normal, and the biopsy is deemed malignant if a minimum number (fixed and validated under cross-validation) of patches is deemed abnormal. Of course, more conservative choices can be made, depending on the weight that is chosen for biopsies classified as false positives or false negative. Since the classification of nuclei patches is quite accurate, one can, for example, conservatively call a slide malignant if a minimum number m (e.g. 10) of nuclei patches are classified as malignant.

The various numbers used for description in the techniques disclosed are meant for illustration purposes. For example, instead of a 15-nearest-neighbor algorithm, one could take a 10-nearest-neighbor algorithm, or any other number. This is the case for each of the numerical parameters that have been given specific values for illustration. In certain embodiments, some of these numbers can be parameters, while other may match exactly those described herein.

While the foregoing has described and illustrated aspects of various embodiments of the present invention, those skilled in the art will recognize that alternative components and techniques, and/or combinations and permutations of the described components and techniques, can be substituted for, or added to, the embodiments described herein. It is intended, therefore, that the present invention not be defined by the specific embodiments described herein, but rather by the appended claims, which are intended to be construed in accordance with the well-settled principles of claim construction, including that: each claim should be given its broadest reasonable interpretation consistent with the specification; limitations should not be read from the specification or drawings into the claims; words in a claim should be given their plain, ordinary, and generic meaning, unless it is readily apparent from the specification that an unusual meaning was intended; an absence of the specific words "means for" connotes applicants' intent not to invoke 35 U.S.C. §112 (6) in construing the limitation; where the phrase "means for" precedes a data processing or manipulation "function," it is intended that the resulting means-plus-function element be construed to cover any, and all, computer implementation(s) of the recited "function"; a claim that contains more than one computer-implemented means-plus-function element should not be construed to require that each means-plus-function element must be a structurally distinct entity (such as a particular piece of hardware or block of code); rather, such claim should be construed merely to require that the overall combination of hardware/firmware/software which implements the invention must, as a whole, implement at least the function(s) called for by the claim's means-plus-function element(s).

We claim:

1. An improved method for training a classifier to classify tissue samples, comprising the steps of:
    determining a tissue type classification based on spectral data of training samples of known target classification;
    generating denoised spectral data from said spectral data based on said tissue type classification; and
    training said classifier on said denoised spectral data to provide a classification of said tissue samples.

2. The method of claim 1, wherein the step of determining comprises the step of classifying said tissue type using a first classifier based on said spectral data.

3. The method of claim 1, further comprising the step of classifying said tissue samples using said classifier.

4. The method of claim 1, wherein the step of determining comprises the step of determining the tissue classification using a local disriminant basis algorithm.

5. The method of claim 1, wherein the step of training comprises the step of training said classifier using Partial Least Squares.

6. The method of claim 1, wherein the step of generating comprises the step of averaging nearby spectra within a fixed tissue type.

7. The method of claim 6, further comprising the step of grouping pixels within a cellular nucleus based on said tissue classification; and wherein the step of averaging comprises the step of averaging all pixels determined to be within said cellular nucleus.

8. A method of classifying tissue samples, comprising the steps of:
    determining a tissue type classification based on spectral data of training samples of known target classification;
    generating denoised spectral data from said spectral data based on said tissue type classification;
    training a classifier on said denoised spectral data; and
    classifying said tissue samples using said classifier.

9. The method of claim 8, wherein said training samples comprises samples containing known cancer tissue and samples not containing said known cancer tissue; and wherein the step of classifying comprises the step of classifying said tissue samples as being cancerous and non-cancerous using said classifier.

10. A system for classifying tissue samples, comprising:
    a preliminary classifier for determining a tissue type classification based on spectral data of training samples of known target classification;
    a processing module for generating denoised spectral data from said spectral data based on said tissue type classification; and
    a training module for training a classifier on said denoised spectral data; and
    wherein said classifier is operable to classify said tissue samples.

11. The system of claim 10, wherein said preliminary classifier is operable to determine the tissue classification using a local disriminant basis algorithm.

12. The system of claim 10, wherein said training module is operable to train said classifier using Partial Least Squares.

13. The system of claim 10, wherein said processing module is operable to average nearby spectra within a fixed tissue type.

14. The system of claim 13, wherein said processing module is operable to group pixels within a cellular nucleus based on said tissue classification, and average all pixels determined to be within said cellular nucleus.

15. The system of claim 10, wherein said training samples comprises samples containing known cancer tissue and samples not containing said known cancer tissue; and wherein said classifier is operable to classify said tissue samples as being cancerous and non-cancerous.

16. A computer readable medium comprising code for classifying tissue samples, said code comprising instructions for:
    determining a tissue type classification based on spectral data of training samples of known target classification;
    generating denoised spectral data from said spectral data based on said tissue type classification;
    training a classifier on said denoised spectral data; and
    classifying said tissue samples using said classifier.

17. The computer readable medium of claim 16, wherein said code further comprising instructions for determining the tissue classification using a local disriminant basis algorithm.

18. The computer readable medium of claim 16, wherein said code further comprising instructions for training said classifier using Partial Least Squares.

19. The computer readable medium of claim 16, wherein said code further comprising instructions for averaging nearby spectra within a fixed tissue type.

20. The computer readable medium of claim 19, wherein said code further comprising instructions for grouping pixels within a cellular nucleus based on said tissue classification; and averaging all pixels determined to be within said cellular nucleus.

21. The computer readable medium of claim 16, wherein said training samples comprises samples containing known cancer tissue and samples not containing said known cancer tissue; and wherein said code further comprising instructions for classifying said tissue samples as being cancerous and non-cancerous using said classifier.

* * * * *